US012169053B2

(12) United States Patent
Lotfi et al.

(10) Patent No.: US 12,169,053 B2
(45) Date of Patent: Dec. 17, 2024

(54) ALTERNATE JUNCTION BOX AND ARRANGEMENT FOR LIGHTING APPARATUS

(71) Applicant: DMF, Inc., Carson, CA (US)

(72) Inventors: Amir Lotfi, Redondo Beach, CA (US); Michael D. Danesh, Carson, CA (US)

(73) Assignee: DMF, Inc., Carson, CA (US)

( * ) Notice: Subject to any disclaimer, the term of this patent is extended or adjusted under 35 U.S.C. 154(b) by 0 days.

(21) Appl. No.: 17/381,147

(22) Filed: Jul. 20, 2021

(65) Prior Publication Data

US 2022/0042664 A1 Feb. 10, 2022

Related U.S. Application Data

(63) Continuation of application No. 15/688,266, filed on Aug. 28, 2017, now Pat. No. 11,067,231.

(51) Int. Cl.

| | |
|---|---|
| ***F21S 8/02*** | (2006.01) |
| ***F21S 9/02*** | (2006.01) |
| ***F21V 17/02*** | (2006.01) |
| ***F21V 17/12*** | (2006.01) |
| ***F21V 21/04*** | (2006.01) |
| ***F21V 23/00*** | (2015.01) |
| ***F21V 23/02*** | (2006.01) |
| ***F21V 23/04*** | (2006.01) |

(Continued)

(52) U.S. Cl.

CPC ............... *F21S 8/026* (2013.01); *F21S 9/022* (2013.01); *F21V 17/02* (2013.01); *F21V 17/12* (2013.01); *F21V 21/04* (2013.01); *F21V 23/003* (2013.01); *F21V 23/026* (2013.01); *F21V 23/04* (2013.01); *F21V 23/06* (2013.01); *F21Y 2115/10* (2016.08)

(58) Field of Classification Search

CPC ...................................................... F21S 8/026
USPC .......................................................... 362/191
See application file for complete search history.

(56) References Cited

U.S. PATENT DOCUMENTS 1,133,535 A 3/1915 Cain et al.
1,471,340 A 10/1923 Knight
(Continued)

FOREIGN PATENT DOCUMENTS

CA 2243934 C 6/2002
CA 2502637 A1 9/2005
(Continued)

OTHER PUBLICATIONS

2006 International Building Code, Section 712 Penetrations, Jan. 2006, 4 pages.
(Continued)

*Primary Examiner* — Rafferty D Kelly
(74) *Attorney, Agent, or Firm* — Smith Baluch LLP

(57) ABSTRACT

Embodiments are directed to a lighting system including a junction box for accommodating a light source assembly, and which is configured to allows for additional components such as separate drivers or emergency ballasts to also be included in the lighting system together with the light source assembly. In embodiments, the junction box is mounted on a pan style frame. In some embodiments, the lighting system includes a test switch mounted on a trim piece that is accessible from below a ceiling in which the lighting system is installed, and which allows for an emergency power supply to be verified.

20 Claims, 7 Drawing Sheets

(51) Int. Cl.
*F21V 23/06* (2006.01)
*F21Y 115/10* (2016.01)

(56) References Cited

U.S. PATENT DOCUMENTS

| | | | |
|---|---|---|---|
| 1,856,356 | A | 5/1932 | Owen |
| 2,038,784 | A | 4/1936 | Ghadiali |
| 2,179,161 | A | 11/1939 | Rambusch |
| 2,197,737 | A | 4/1940 | Appleton |
| 2,352,913 | A | 7/1944 | Morrill |
| 2,528,989 | A | 11/1950 | Ammells |
| 2,597,595 | A | 5/1952 | Ordas |
| 2,642,246 | A | 6/1953 | Larry |
| 2,670,919 | A | 3/1954 | Vincent |
| 2,697,535 | A | 12/1954 | Olson |
| 2,758,810 | A | 8/1956 | Good |
| D180,844 | S | 8/1957 | Poliakoff |
| 2,802,933 | A | 8/1957 | Broadwin |
| 2,809,002 | A | 10/1957 | Rudolph |
| 2,998,512 | A | 8/1961 | Duchene et al. |
| 3,023,920 | A | 3/1962 | Cook et al. |
| 3,057,993 | A | 10/1962 | Gellert |
| 3,104,087 | A | 9/1963 | Joseph et al. |
| 3,214,126 | A | 10/1965 | Roos |
| 3,422,261 | A | 1/1969 | McGinty |
| 3,460,299 | A | 8/1969 | Wilson |
| 3,650,046 | A | 3/1972 | Skinner |
| 3,675,807 | A | 7/1972 | Lund et al. |
| 3,700,885 | A | 10/1972 | Bobrick |
| 3,711,053 | A | 1/1973 | Drake |
| D227,989 | S | 7/1973 | Geisel |
| 3,773,968 | A | 11/1973 | Copp |
| 3,812,342 | A | 5/1974 | Mcnamara |
| 3,836,766 | A | 9/1974 | Auerbach |
| 3,874,035 | A | 4/1975 | Schuplin |
| 3,913,773 | A | 10/1975 | Copp et al. |
| D245,905 | S | 9/1977 | Taylor |
| 4,050,603 | A | 9/1977 | Harris et al. |
| 4,062,512 | A | 12/1977 | Arnold |
| 4,088,827 | A | 5/1978 | Kohaut |
| 4,176,758 | A | 12/1979 | Glick |
| 4,280,169 | A | 7/1981 | Allen |
| D267,694 | S | 1/1983 | Moriarty et al. |
| D267,695 | S | 1/1983 | Paquette et al. |
| D267,775 | S | 2/1983 | Holcombe |
| 4,399,497 | A | 8/1983 | Druffel |
| 4,450,512 | A | 5/1984 | Kristofek |
| 4,460,948 | A | 7/1984 | Malola |
| 4,520,435 | A | 5/1985 | Baldwin |
| 4,539,629 | A | 9/1985 | Poppenheimer |
| 4,601,145 | A | 7/1986 | Wilcox |
| 4,667,840 | A | 5/1987 | Lindsey |
| 4,723,747 | A | 2/1988 | Karp et al. |
| 4,729,080 | A | 3/1988 | Fremont et al. |
| 4,733,339 | A | 3/1988 | Kelsall |
| 4,754,377 | A | 6/1988 | Wenman |
| 4,770,311 | A | 9/1988 | Wang |
| 4,880,128 | A | 11/1989 | Jorgensen |
| 4,910,651 | A | 3/1990 | Montanez |
| 4,919,292 | A | 4/1990 | Hsu |
| 4,929,187 | A | 5/1990 | Hudson et al. |
| 4,930,054 | A | 5/1990 | Krebs |
| 5,044,582 | A | 9/1991 | Walters |
| D326,537 | S | 5/1992 | Gattari |
| 5,216,203 | A | 6/1993 | Gower |
| 5,222,800 | A | 6/1993 | Chan et al. |
| 5,239,132 | A | 8/1993 | Bartow |
| 5,250,269 | A | 10/1993 | Langer et al. |
| D340,856 | S | 11/1993 | McHugh |
| D341,819 | S | 11/1993 | Carlstrom |
| 5,266,050 | A | 11/1993 | O'Neil et al. |
| 5,291,381 | A | 3/1994 | Price |
| 5,303,894 | A | 4/1994 | Deschamps et al. |
| 5,382,752 | A | 1/1995 | Reyhan et al. |
| 5,420,376 | A | 5/1995 | Rajecki et al. |
| 5,465,199 | A | 11/1995 | Bray et al. |
| D365,165 | S | 12/1995 | Stultz |
| 5,505,419 | A | 4/1996 | Gabrius |
| 5,544,870 | A | 8/1996 | Kelly et al. |
| 5,562,343 | A | 10/1996 | Chan et al. |
| 5,571,993 | A | 11/1996 | Jones et al. |
| 5,580,158 | A | 12/1996 | Aubrey et al. |
| 5,588,737 | A | 12/1996 | Kusmer |
| 5,603,424 | A | 2/1997 | Bordwell et al. |
| 5,609,408 | A | 3/1997 | Targetti |
| 5,613,338 | A | 3/1997 | Esposito |
| D381,111 | S | 7/1997 | Lecluze |
| 5,662,413 | A | 9/1997 | Akiyama et al. |
| D386,277 | S | 11/1997 | Lecluze |
| 5,690,423 | A | 11/1997 | Hentz et al. |
| D387,466 | S | 12/1997 | Lecluze |
| 5,738,436 | A | 4/1998 | Cummings et al. |
| 5,778,625 | A | 7/1998 | Druffel et al. |
| 5,836,678 | A | 11/1998 | Wright et al. |
| 5,942,726 | A | 8/1999 | Reiker |
| 5,944,412 | A | 8/1999 | Janos et al. |
| 5,957,573 | A | 9/1999 | Wedekind et al. |
| 6,030,102 | A | 2/2000 | Gromotka |
| 6,033,098 | A | 3/2000 | Hentz et al. |
| 6,076,788 | A | 6/2000 | Akiyama |
| 6,082,878 | A | 7/2000 | Doubek et al. |
| 6,095,669 | A | 8/2000 | Cho |
| 6,098,945 | A | 8/2000 | Korcz |
| 6,105,334 | A | 8/2000 | Monson et al. |
| 6,161,910 | A | 12/2000 | Reisenauer et al. |
| 6,170,685 | B1 | 1/2001 | Currier |
| 6,174,076 | B1 | 1/2001 | Petrakis et al. |
| 6,176,599 | B1 | 1/2001 | Farzen |
| 6,267,491 | B1 | 7/2001 | Parrigin |
| 6,332,597 | B1 | 12/2001 | Korcz et al. |
| 6,350,043 | B1 | 2/2002 | Gloisten |
| 6,350,046 | B1 | 2/2002 | Lau |
| 6,364,511 | B1 | 4/2002 | Cohen |
| 6,375,338 | B1 | 4/2002 | Cummings et al. |
| 6,402,112 | B1 | 6/2002 | Thomas et al. |
| D461,455 | S | 8/2002 | Forbes |
| 6,461,016 | B1 | 10/2002 | Jamison et al. |
| 6,474,846 | B1 | 11/2002 | Kelmelis et al. |
| 6,491,270 | B1 | 12/2002 | Pfaller |
| 6,491,413 | B1 | 12/2002 | Benesohn |
| D468,697 | S | 1/2003 | Straub, Jr. |
| D470,970 | S | 2/2003 | Huang |
| 6,515,313 | B1 | 2/2003 | Ibbetson et al. |
| 6,521,833 | B1 | 2/2003 | DeFreitas |
| D471,657 | S | 3/2003 | Huang |
| 6,583,573 | B2 | 6/2003 | Bierman |
| 6,585,389 | B2 | 7/2003 | Bonazzi |
| 6,600,175 | B1 | 7/2003 | Baretz et al. |
| D478,872 | S | 8/2003 | Heggem |
| 6,632,006 | B1 | 10/2003 | Rippel et al. |
| 6,657,236 | B1 | 12/2003 | Thibeault et al. |
| 6,666,419 | B1 | 12/2003 | Vrame |
| D488,583 | S | 4/2004 | Benghozi |
| 6,719,438 | B2 | 4/2004 | Sevack et al. |
| 6,758,578 | B1 | 7/2004 | Chou |
| 6,777,615 | B1 | 8/2004 | Gretz |
| 6,779,908 | B1 | 8/2004 | Ng |
| 6,827,229 | B2 | 12/2004 | Dinh et al. |
| 6,827,471 | B1 | 12/2004 | Benghozi |
| 6,838,618 | B2 | 1/2005 | Newbold et al. |
| 6,889,943 | B2 | 5/2005 | Dinh et al. |
| 6,906,352 | B2 | 6/2005 | Edmond et al. |
| D509,314 | S | 9/2005 | Rashidi |
| 6,948,829 | B2 | 9/2005 | Verdes et al. |
| 6,958,497 | B2 | 10/2005 | Emerson et al. |
| 6,964,501 | B2 | 11/2005 | Ryan |
| 6,967,284 | B1 | 11/2005 | Gretz |
| D516,235 | S | 2/2006 | Rashidi |
| 7,025,477 | B2 | 4/2006 | Blessing |
| 7,064,269 | B2 | 6/2006 | Smith |
| D528,673 | S | 9/2006 | Maxik et al. |
| 7,102,172 | B2 | 9/2006 | Lynch |
| D531,740 | S | 11/2006 | Maxik |
| D532,532 | S | 11/2006 | Maxik |

(56) References Cited

U.S. PATENT DOCUMENTS

| | | | | |
|---|---|---|---|---|
| 7,148,420 | B1 | 12/2006 | Johnson et al. | |
| 7,148,632 | B2 | 12/2006 | Berman et al. | |
| 7,154,040 | B1 | 12/2006 | Tompkins | |
| 7,170,015 | B1 | 1/2007 | Roesch et al. | |
| D536,349 | S | 2/2007 | Humber et al. | |
| D537,039 | S | 2/2007 | Pincek | |
| D539,229 | S | 3/2007 | Murphey | |
| 7,186,008 | B2 | 3/2007 | Patti | |
| 7,190,126 | B1 | 3/2007 | Paton | |
| 7,211,833 | B2 | 5/2007 | Slater, Jr. et al. | |
| 7,213,940 | B1 | 5/2007 | Van De Ven et al. | |
| 7,234,674 | B2 | 6/2007 | Rippel et al. | |
| D547,889 | S | 7/2007 | Huang | |
| D552,969 | S | 10/2007 | Bobrowski et al. | |
| D553,267 | S | 10/2007 | Yuen | |
| D555,106 | S | 11/2007 | Pape et al. | |
| D556,144 | S | 11/2007 | Dinh | |
| 7,297,870 | B1 | 11/2007 | Sartini | |
| 7,312,474 | B2 | 12/2007 | Emerson et al. | |
| 7,320,536 | B2 | 1/2008 | Petrakis et al. | |
| D561,372 | S | 2/2008 | Yan | |
| D561,373 | S | 2/2008 | Yan | |
| 7,335,920 | B2 | 2/2008 | Denbaars et al. | |
| D563,896 | S | 3/2008 | Greenslate | |
| 7,347,580 | B2 | 3/2008 | Blackman et al. | |
| D570,012 | S | 5/2008 | Huang | |
| 7,374,308 | B2 | 5/2008 | Sevack et al. | |
| D570,504 | S | 6/2008 | Maxik et al. | |
| D570,505 | S | 6/2008 | Maxik et al. | |
| 7,399,104 | B2 | 7/2008 | Rappaport | |
| 7,413,156 | B1 | 8/2008 | Cho | |
| 7,429,025 | B1 | 9/2008 | Gretz | |
| D578,677 | S | 10/2008 | Huang | |
| 7,431,482 | B1 * | 10/2008 | Morgan | F21S 2/005 362/249.07 |
| 7,432,440 | B2 | 10/2008 | Hull et al. | |
| 7,442,883 | B2 | 10/2008 | Jolly et al. | |
| 7,446,345 | B2 | 11/2008 | Emerson et al. | |
| 7,470,048 | B2 | 12/2008 | Wu | |
| 7,473,005 | B2 | 1/2009 | O'Brien | |
| 7,488,097 | B2 | 2/2009 | Reisenauer et al. | |
| 7,488,098 | B2 | 2/2009 | Dumont | |
| 7,494,258 | B2 | 2/2009 | McNaught | |
| 7,503,145 | B2 | 3/2009 | Newbold et al. | |
| 7,510,159 | B2 | 3/2009 | Rippel | |
| 7,524,089 | B2 | 4/2009 | Park | |
| D591,894 | S | 5/2009 | Flank | |
| D592,945 | S | 5/2009 | Mahan | |
| 7,534,989 | B2 | 5/2009 | Suehara et al. | |
| D596,154 | S | 7/2009 | Rivkin | |
| 7,566,154 | B2 | 7/2009 | Gloisten et al. | |
| D599,040 | S | 8/2009 | Alexander et al. | |
| D600,836 | S | 9/2009 | Hanley et al. | |
| 7,588,359 | B2 | 9/2009 | Coushaine et al. | |
| 7,592,583 | B2 | 9/2009 | Page et al. | |
| D606,696 | S | 12/2009 | Chen et al. | |
| 7,625,105 | B1 | 12/2009 | Johnson | |
| 7,628,513 | B2 | 12/2009 | Chiu | |
| 7,651,238 | B2 | 1/2010 | O'Brien | |
| 7,654,705 | B2 | 2/2010 | Czech et al. | |
| D611,650 | S | 3/2010 | Broekhoff | |
| 7,670,021 | B2 | 3/2010 | Chou | |
| 7,673,841 | B2 | 3/2010 | Wronski | |
| 7,677,766 | B2 | 3/2010 | Boyer | |
| D613,444 | S | 4/2010 | Rashidi | |
| 7,692,182 | B2 | 4/2010 | Bergmann et al. | |
| 7,704,763 | B2 | 4/2010 | Fujii et al. | |
| D616,118 | S | 5/2010 | Thomas et al. | |
| 7,712,922 | B2 | 5/2010 | Hacker et al. | |
| 7,722,208 | B1 | 5/2010 | Dupre et al. | |
| 7,722,227 | B2 | 5/2010 | Zhang et al. | |
| 7,735,795 | B2 | 6/2010 | Wronski | |
| 7,735,798 | B2 | 6/2010 | Kojima | |
| 7,748,887 | B2 | 7/2010 | Zampini, II et al. | |
| 7,766,518 | B2 | 8/2010 | Piepgras et al. | |
| 7,769,192 | B2 | 8/2010 | Takagi et al. | |
| 7,771,082 | B2 | 8/2010 | Peng | |
| 7,771,094 | B2 | 8/2010 | Goode | |
| 7,784,754 | B2 | 8/2010 | Nevers et al. | |
| D624,691 | S | 9/2010 | Zhang et al. | |
| D624,692 | S | 9/2010 | Mackin et al. | |
| D625,847 | S | 10/2010 | Maglica | |
| D625,876 | S | 10/2010 | Chen et al. | |
| 7,810,775 | B2 | 10/2010 | Ponte et al. | |
| D627,507 | S | 11/2010 | Lai et al. | |
| D627,727 | S | 11/2010 | Alexander et al. | |
| 7,828,465 | B2 | 11/2010 | Roberge et al. | |
| D629,366 | S | 12/2010 | Ericson et al. | |
| 7,845,393 | B2 | 12/2010 | Kao et al. | |
| 7,857,275 | B2 | 12/2010 | de la Borbolla | |
| 7,871,184 | B2 | 1/2011 | Peng | |
| 7,874,539 | B2 | 1/2011 | Wright et al. | |
| 7,874,703 | B2 | 1/2011 | Shastry et al. | |
| 7,874,709 | B1 | 1/2011 | Beadle | |
| D633,224 | S | 2/2011 | Lee | |
| 7,909,487 | B1 | 3/2011 | Venetucci et al. | |
| D636,117 | S | 4/2011 | Kim et al. | |
| D636,118 | S | 4/2011 | Kim et al. | |
| D636,903 | S | 4/2011 | Torenbeek | |
| D637,339 | S | 5/2011 | Hasan et al. | |
| D637,340 | S | 5/2011 | Hasan et al. | |
| 7,950,832 | B2 | 5/2011 | Tanaka et al. | |
| D639,499 | S | 6/2011 | Choi et al. | |
| D640,819 | S | 6/2011 | Pan | |
| 7,956,546 | B2 | 6/2011 | Hasnain | |
| 7,959,332 | B2 | 6/2011 | Tickner et al. | |
| 7,967,480 | B2 | 6/2011 | Pickard et al. | |
| D642,317 | S | 7/2011 | Rashidi | |
| 7,972,035 | B2 | 7/2011 | Boyer | |
| 7,972,043 | B2 | 7/2011 | Schutte | |
| D642,536 | S | 8/2011 | Robinson | |
| D643,970 | S | 8/2011 | Kim et al. | |
| 7,993,037 | B1 | 8/2011 | Buse | |
| 8,002,425 | B2 | 8/2011 | Russo et al. | |
| D646,011 | S | 9/2011 | Rashidi | |
| 8,013,243 | B2 | 9/2011 | Korcz et al. | |
| 8,038,113 | B2 | 10/2011 | Fryzek et al. | |
| D648,476 | S | 11/2011 | Choi et al. | |
| D648,477 | S | 11/2011 | Kim et al. | |
| D650,115 | S | 12/2011 | Kim et al. | |
| 8,070,328 | B1 | 12/2011 | Knoble et al. | |
| 8,096,670 | B2 | 1/2012 | Trott | |
| D654,205 | S | 2/2012 | Rashidi | |
| D655,436 | S | 3/2012 | Johnson | |
| D656,262 | S | 3/2012 | Yoshinobu et al. | |
| D656,263 | S | 3/2012 | Ogawa et al. | |
| 8,142,057 | B2 | 3/2012 | Roos et al. | |
| 8,152,334 | B2 | 4/2012 | Krogman | |
| D658,788 | S | 5/2012 | Dudik et al. | |
| D658,802 | S | 5/2012 | Chen | |
| D659,862 | S | 5/2012 | Tsai | |
| D659,879 | S | 5/2012 | Rashidi | |
| D660,814 | S | 5/2012 | Wilson | |
| 8,177,176 | B2 | 5/2012 | Nguyen et al. | |
| 8,182,116 | B2 | 5/2012 | Zhang et al. | |
| 8,201,968 | B2 | 6/2012 | Maxik et al. | |
| D663,058 | S | 7/2012 | Pan | |
| D663,466 | S | 7/2012 | Rashidi | |
| D664,274 | S | 7/2012 | de Visser et al. | |
| D664,705 | S | 7/2012 | Kong et al. | |
| 8,215,805 | B2 | 7/2012 | Cogliano et al. | |
| 8,220,970 | B1 | 7/2012 | Khazi et al. | |
| 8,226,270 | B2 | 7/2012 | Yamamoto et al. | |
| 8,235,549 | B2 | 8/2012 | Gingrich, III et al. | |
| 8,240,630 | B2 | 8/2012 | Wronski | |
| D667,155 | S | 9/2012 | Rashidi | |
| 8,262,255 | B1 | 9/2012 | Rashidi | |
| D668,372 | S | 10/2012 | Renshaw et al. | |
| D668,809 | S | 10/2012 | Rashidi | |
| D669,198 | S | 10/2012 | Qui | |
| D669,199 | S | 10/2012 | Chuang | |
| D669,620 | S | 10/2012 | Rashidi | |
| 8,277,090 | B2 | 10/2012 | Fryzek et al. | |
| D671,668 | S | 11/2012 | Rowlette, Jr. et al. | |

(56) References Cited

U.S. PATENT DOCUMENTS

| | | | |
|---|---|---|---|
| 8,308,322 | B2 | 11/2012 | Santiago et al. |
| D672,899 | S | 12/2012 | Ven et al. |
| D673,869 | S | 1/2013 | Yu |
| D676,263 | S | 2/2013 | Birke |
| D676,814 | S | 2/2013 | Paul |
| 8,376,593 | B2 | 2/2013 | Bazydola et al. |
| D677,417 | S | 3/2013 | Rashidi |
| D677,634 | S | 3/2013 | Korcz et al. |
| D679,044 | S | 3/2013 | Jeswani et al. |
| D679,047 | S | 3/2013 | Tickner et al. |
| 8,403,533 | B1 | 3/2013 | Paulsel |
| 8,403,541 | B1 | 3/2013 | Rashidi |
| 8,405,947 | B1 | 3/2013 | Green et al. |
| D681,259 | S | 4/2013 | Kong |
| 8,408,759 | B1 | 4/2013 | Rashidi |
| D682,459 | S | 5/2013 | Gordin et al. |
| D683,063 | S | 5/2013 | Lopez et al. |
| D683,890 | S | 6/2013 | Lopez et al. |
| D684,269 | S | 6/2013 | Wang et al. |
| D684,287 | S | 6/2013 | Rashidi |
| D684,719 | S | 6/2013 | Rashidi |
| D685,118 | S | 6/2013 | Rashidi |
| D685,120 | S | 6/2013 | Rashidi |
| 8,454,204 | B1 | 6/2013 | Chang et al. |
| D685,507 | S | 7/2013 | Sun |
| D687,586 | S | 8/2013 | Rashidi |
| D687,587 | S | 8/2013 | Rashidi |
| D687,588 | S | 8/2013 | Rashidi |
| D687,980 | S | 8/2013 | Gravely et al. |
| D688,405 | S | 8/2013 | Kim et al. |
| 8,506,127 | B2 | 8/2013 | Russello et al. |
| 8,506,134 | B2 | 8/2013 | Wilson et al. |
| D690,049 | S | 9/2013 | Rashidi |
| D690,864 | S | 10/2013 | Rashidi |
| D690,865 | S | 10/2013 | Rashidi |
| D690,866 | S | 10/2013 | Rashidi |
| D691,314 | S | 10/2013 | Rashidi |
| D691,315 | S | 10/2013 | Samson |
| D691,763 | S | 10/2013 | Hand et al. |
| 8,550,669 | B2 | 10/2013 | Macwan et al. |
| D693,043 | S | 11/2013 | Schmalfuss et al. |
| D693,517 | S | 11/2013 | Davis |
| D694,456 | S | 11/2013 | Rowlette, Jr. et al. |
| 8,573,816 | B2 | 11/2013 | Negley et al. |
| D695,441 | S | 12/2013 | Lui et al. |
| D695,941 | S | 12/2013 | Rashidi |
| D696,446 | S | 12/2013 | Huh |
| D696,447 | S | 12/2013 | Huh |
| D696,448 | S | 12/2013 | Huh |
| 8,602,601 | B2 | 12/2013 | Khazi et al. |
| D698,067 | S | 1/2014 | Rashidi |
| D698,068 | S | 1/2014 | Rashidi |
| 8,622,361 | B2 | 1/2014 | Wronski |
| 8,632,040 | B2 | 1/2014 | Mass et al. |
| D698,985 | S | 2/2014 | Lopez et al. |
| D699,384 | S | 2/2014 | Rashidi |
| D699,687 | S | 2/2014 | Baldwin et al. |
| D700,387 | S | 2/2014 | Snell |
| 8,641,243 | B1 | 2/2014 | Rashidi |
| 8,659,034 | B2 | 2/2014 | Baretz et al. |
| D700,991 | S | 3/2014 | Johnson et al. |
| D701,175 | S | 3/2014 | Baldwin et al. |
| D701,466 | S | 3/2014 | Clifford et al. |
| 8,672,518 | B2 | 3/2014 | Boomgaarden et al. |
| D702,867 | S | 4/2014 | Kim et al. |
| D703,843 | S | 4/2014 | Cheng |
| 8,684,569 | B2 | 4/2014 | Pickard et al. |
| 8,696,158 | B2 | 4/2014 | Santiago et al. |
| D705,472 | S | 5/2014 | Huh |
| D705,481 | S | 5/2014 | Zhang et al. |
| 8,727,582 | B2 | 5/2014 | Brown et al. |
| D708,381 | S | 7/2014 | Rashidi |
| 8,777,449 | B2 | 7/2014 | Ven et al. |
| D710,529 | S | 8/2014 | Lopez et al. |
| 8,801,217 | B2 | 8/2014 | Oehle et al. |
| 8,820,985 | B1 | 9/2014 | Tam et al. |
| 8,833,013 | B2 | 9/2014 | Harman |
| 8,845,144 | B1 | 9/2014 | Davies et al. |
| D714,989 | S | 10/2014 | Rowlette, Jr. et al. |
| 8,870,426 | B2 | 10/2014 | Biebl et al. |
| 8,890,414 | B2 | 11/2014 | Rowlette, Jr. et al. |
| D721,845 | S | 1/2015 | Lui et al. |
| 8,926,133 | B2 | 1/2015 | Booth |
| 8,939,418 | B2 | 1/2015 | Green et al. |
| D722,296 | S | 2/2015 | Taylor |
| D722,977 | S | 2/2015 | Hagarty |
| D722,978 | S | 2/2015 | Hagarty |
| 8,950,898 | B2 | 2/2015 | Catalano |
| D723,781 | S | 3/2015 | Miner |
| D723,783 | S | 3/2015 | Miner |
| D725,359 | S | 3/2015 | Miner |
| 8,967,575 | B1 | 3/2015 | Gretz |
| D726,363 | S | 4/2015 | Danesh |
| D726,949 | S | 4/2015 | Redfern |
| D728,129 | S | 4/2015 | Kreuzbichler |
| 9,004,435 | B2 | 4/2015 | Wronski |
| 9,039,254 | B2 | 5/2015 | Danesh |
| D731,689 | S | 6/2015 | Bernard et al. |
| 9,062,866 | B1 | 6/2015 | Christ et al. |
| 9,065,264 | B2 | 6/2015 | Cooper et al. |
| 9,068,719 | B2 | 6/2015 | Van De Ven et al. |
| 9,068,722 | B2 | 6/2015 | Wronski et al. |
| D734,525 | S | 7/2015 | Gordin et al. |
| D735,012 | S | 7/2015 | Cowie |
| D735,142 | S | 7/2015 | Hagarty |
| 9,078,299 | B2 | 7/2015 | Ashdown |
| 9,109,783 | B1 | 8/2015 | Davis et al. |
| D739,355 | S | 9/2015 | D'Aubeterre |
| D739,590 | S | 9/2015 | Redfern |
| 9,140,441 | B2 | 9/2015 | Goelz et al. |
| D741,538 | S | 10/2015 | Ghasabi |
| D742,325 | S | 10/2015 | Leung |
| 9,151,457 | B2 | 10/2015 | Pickard et al. |
| 9,151,477 | B2 | 10/2015 | Pickard et al. |
| D743,079 | S | 11/2015 | Adair |
| D744,723 | S | 12/2015 | Yoo |
| 9,217,560 | B2 | 12/2015 | Harbers et al. |
| 9,222,661 | B2 | 12/2015 | Kim et al. |
| 9,239,131 | B1 | 1/2016 | Wronski et al. |
| D750,317 | S | 2/2016 | Lui et al. |
| 9,285,103 | B2 | 3/2016 | Van De Ven et al. |
| 9,291,319 | B2 | 3/2016 | Kathawate et al. |
| 9,301,362 | B2 | 3/2016 | Dohn et al. |
| D754,078 | S | 4/2016 | Baldwin et al. |
| D754,079 | S | 4/2016 | Baldwin et al. |
| D754,605 | S | 4/2016 | McMillan |
| 9,303,812 | B2 | 4/2016 | Green et al. |
| 9,310,038 | B2 | 4/2016 | Athalye |
| 9,322,543 | B2 | 4/2016 | Hussell et al. |
| 9,347,655 | B2 | 5/2016 | Boomgaarden et al. |
| 9,366,418 | B2 | 6/2016 | Gifford |
| 9,371,966 | B2 | 6/2016 | Rowlette, Jr. et al. |
| D762,181 | S | 7/2016 | Lin |
| 9,395,051 | B2 | 7/2016 | Hussell et al. |
| D762,906 | S | 8/2016 | Jeswani et al. |
| D764,079 | S | 8/2016 | Wu |
| 9,404,639 | B2 | 8/2016 | Bailey et al. |
| 9,417,506 | B1 | 8/2016 | Tirosh |
| 9,423,110 | B1 | 8/2016 | Newton et al. |
| D766,185 | S | 9/2016 | Hagarty |
| D767,199 | S | 9/2016 | Wronski et al. |
| 9,447,917 | B1 | 9/2016 | Wronski et al. |
| 9,447,953 | B2 | 9/2016 | Lawlor |
| D768,325 | S | 10/2016 | Xu |
| D768,326 | S | 10/2016 | Guzzini |
| D769,501 | S | 10/2016 | Jeswani et al. |
| D770,065 | S | 10/2016 | Tittle |
| D770,076 | S | 10/2016 | Li et al. |
| 9,476,552 | B2 | 10/2016 | Myers et al. |
| D774,676 | S | 12/2016 | Ng |
| D776,324 | S | 1/2017 | Gierl et al. |
| D777,967 | S | 1/2017 | Redfern |
| 9,534,751 | B2 | 1/2017 | Maglica et al. |
| D778,241 | S | 2/2017 | Holbrook et al. |

(56) References Cited

U.S. PATENT DOCUMENTS

| | | | |
|---|---|---|---|
| D778,484 S | 2/2017 | Guzzini | |
| D779,100 S | 2/2017 | Redfern | |
| 9,581,302 B2 | 2/2017 | Danesh | |
| 9,583,926 B2 | 2/2017 | Ye | |
| 9,599,315 B1 | 3/2017 | Harpenau et al. | |
| 9,605,842 B1 | 3/2017 | Davis | |
| 9,605,910 B2 | 3/2017 | Swedberg et al. | |
| D785,228 S | 4/2017 | Guzzini | |
| D786,472 S | 5/2017 | Redfern | |
| D786,473 S | 5/2017 | Dean | |
| D786,474 S | 5/2017 | Fujisawa | |
| D788,330 S | 5/2017 | Johnson et al. | |
| D790,102 S | 6/2017 | Guzzini | |
| 9,673,597 B2 | 6/2017 | Lee | |
| 9,689,541 B2 | 6/2017 | Wronski | |
| D791,709 S | 7/2017 | Holton | |
| D791,711 S | 7/2017 | Holton | |
| D791,712 S | 7/2017 | Holton | |
| 9,696,021 B2 | 7/2017 | Wronski | |
| 9,702,516 B1 | 7/2017 | Vasquez et al. | |
| D795,820 S | 8/2017 | Wengreen | |
| 9,732,904 B1 | 8/2017 | Wronski | |
| 9,732,947 B1 | 8/2017 | Christ et al. | |
| 9,739,464 B2 | 8/2017 | Wronski | |
| D799,105 S | 10/2017 | Eder et al. | |
| D800,957 S | 10/2017 | Eder et al. | |
| 9,791,111 B1 | 10/2017 | Huang et al. | |
| 9,797,562 B2 | 10/2017 | Dabiet et al. | |
| 9,803,839 B2 | 10/2017 | Visser et al. | |
| D805,660 S | 12/2017 | Creasman et al. | |
| D805,881 S | 12/2017 | Nehls | |
| 9,854,642 B2 | 12/2017 | Kashani | |
| D809,176 S | 1/2018 | Partington | |
| 9,860,961 B2 | 1/2018 | Chemel et al. | |
| 9,863,619 B2 | 1/2018 | Mak | |
| D809,465 S | 2/2018 | Keirstead | |
| 9,903,569 B2 | 2/2018 | O'Brien et al. | |
| 9,945,548 B2 | 4/2018 | Williams et al. | |
| 9,964,266 B2 | 5/2018 | Danesh | |
| D819,879 S | 6/2018 | Oudina et al. | |
| D820,494 S | 6/2018 | Cohen | |
| D821,615 S | 6/2018 | Trice | |
| D821,627 S | 6/2018 | Ko | |
| 9,995,441 B2 | 6/2018 | Power et al. | |
| 10,006,613 B2 | 6/2018 | Oudina et al. | |
| D822,505 S | 7/2018 | Gibson et al. | |
| D824,494 S | 7/2018 | Martins et al. | |
| D825,829 S | 8/2018 | Guo | |
| 10,041,638 B2 | 8/2018 | Vasquez et al. | |
| 10,054,274 B2 | 8/2018 | Athalye et al. | |
| D827,903 S | 9/2018 | Wu | |
| 10,072,805 B2 | 9/2018 | Bailey | |
| D832,218 S | 10/2018 | Wronski et al. | |
| D833,977 S | 11/2018 | Danesh et al. | |
| 10,125,959 B2 | 11/2018 | Cohen | |
| 10,139,059 B2 | 11/2018 | Danesh | |
| D834,928 S | 12/2018 | Lu et al. | |
| D836,976 S | 1/2019 | Reese et al. | |
| 10,244,607 B1 | 3/2019 | Kashani | |
| D847,414 S | 4/2019 | Danesh et al. | |
| D847,415 S | 4/2019 | Danesh et al. | |
| 10,247,390 B1 | 4/2019 | Kopitzke et al. | |
| D848,375 S | 5/2019 | Danesh et al. | |
| 10,281,131 B2 | 5/2019 | Cohen | |
| 10,295,163 B1 | 5/2019 | Cohen | |
| D850,695 S | 6/2019 | Dabiet et al. | |
| D851,046 S | 6/2019 | Peng et al. | |
| 10,408,395 B2 | 9/2019 | Danesh | |
| 10,408,396 B2 | 9/2019 | Wronski et al. | |
| 10,408,436 B2 | 9/2019 | Wronski et al. | |
| D863,661 S | 10/2019 | Tian et al. | |
| D864,467 S | 10/2019 | Mizobe | |
| D864,877 S | 10/2019 | Danesh | |
| D867,653 S | 11/2019 | Gorman | |
| 10,488,000 B2 | 11/2019 | Danesh et al. | |
| 10,541,522 B2 | 1/2020 | Lalancette | |
| 10,551,044 B2 | 2/2020 | Peng et al. | |
| 10,563,850 B2 | 2/2020 | Danesh | |
| D877,957 S | 3/2020 | Kopitzke, IV | |
| 10,591,120 B2 | 3/2020 | Bailey et al. | |
| 10,609,785 B1 | 3/2020 | Fardadi et al. | |
| D880,733 S | 4/2020 | Lo et al. | |
| D883,562 S | 5/2020 | Hu | |
| D885,648 S | 5/2020 | Zeng | |
| D885,649 S | 5/2020 | McLaughlin, III et al. | |
| 10,663,127 B2 | 5/2020 | Danesh et al. | |
| 10,663,153 B2 | 5/2020 | Nikooyan et al. | |
| D888,313 S | 6/2020 | Xie et al. | |
| 10,683,994 B2 | 6/2020 | Wronski et al. | |
| 10,684,003 B2 | 6/2020 | Wronski et al. | |
| D890,410 S | 7/2020 | Stanford et al. | |
| 10,704,745 B2 | 7/2020 | Sherry et al. | |
| D892,069 S | 8/2020 | Cohen | |
| 10,753,558 B2 | 8/2020 | Danesh | |
| 10,808,917 B2 | 10/2020 | Harris et al. | |
| 10,816,148 B2 | 10/2020 | Danesh | |
| D901,398 S | 11/2020 | Danesh et al. | |
| D901,745 S | 11/2020 | Yang | |
| D902,871 S | 11/2020 | Danesh et al. | |
| D903,605 S | 12/2020 | Danesh et al. | |
| D905,327 S | 12/2020 | Williams et al. | |
| D907,284 S | 1/2021 | Danesh et al. | |
| D910,223 S | 2/2021 | Cohen | |
| 10,975,570 B2 | 4/2021 | Shen | |
| 10,982,829 B2 | 4/2021 | Danesh | |
| 11,022,259 B2 | 6/2021 | Bailey et al. | |
| 11,028,982 B2 | 6/2021 | Danesh | |
| 11,047,538 B2 | 6/2021 | Danesh et al. | |
| D924,467 S | 7/2021 | Danesh et al. | |
| D925,109 S | 7/2021 | Danesh et al. | |
| 11,060,705 B1 | 7/2021 | Danesh et al. | |
| 11,067,231 B2 * | 7/2021 | Lotfi | F21V 23/06 |
| D927,430 S | 8/2021 | Cohen et al. | |
| 11,085,597 B2 | 8/2021 | Danesh | |
| 11,118,768 B2 | 9/2021 | Danesh | |
| D934,665 S | 11/2021 | Cronkhite et al. | |
| D939,134 S | 12/2021 | Danesh et al. | |
| D940,545 S | 1/2022 | Tanner et al. | |
| 11,231,154 B2 | 1/2022 | Kopitzke et al. | |
| D944,212 S | 2/2022 | Peng et al. | |
| 11,242,983 B2 | 2/2022 | Danesh | |
| 11,255,497 B2 | 2/2022 | Danesh | |
| 11,274,821 B2 | 3/2022 | Danesh | |
| 11,306,903 B2 | 4/2022 | Young | |
| 11,391,442 B2 | 7/2022 | Danesh | |
| 11,435,064 B1 | 9/2022 | Danesh | |
| 11,435,066 B2 | 9/2022 | Danesh | |
| 11,448,384 B2 | 9/2022 | Nikooyan et al. | |
| D966,877 S | 10/2022 | Kopitzke et al. | |
| D970,081 S | 11/2022 | Kopitzke et al. | |
| 2002/0172047 A1 | 11/2002 | Ashley | |
| 2003/0006353 A1 | 1/2003 | Dinh et al. | |
| 2003/0016532 A1 | 1/2003 | Reed | |
| 2003/0021104 A1 | 1/2003 | Tsao | |
| 2003/0092323 A1 | 5/2003 | Chou | |
| 2003/0161153 A1 | 8/2003 | Patti | |
| 2004/0001337 A1 | 1/2004 | Defouw et al. | |
| 2004/0120141 A1 | 6/2004 | Beadle | |
| 2004/0156199 A1 | 8/2004 | Rivas et al. | |
| 2005/0078474 A1 | 4/2005 | Whitfield | |
| 2005/0121215 A1 | 6/2005 | Halbert | |
| 2005/0225966 A1 | 10/2005 | Hartmann et al. | |
| 2005/0227536 A1 | 10/2005 | Gamache et al. | |
| 2005/0231962 A1 | 10/2005 | Koba et al. | |
| 2005/0237746 A1 | 10/2005 | Yiu | |
| 2006/0005988 A1 | 1/2006 | Jorgensen | |
| 2006/0158873 A1 | 7/2006 | Newbold et al. | |
| 2006/0198126 A1 | 9/2006 | Jones | |
| 2006/0215408 A1 | 9/2006 | Lee | |
| 2006/0221620 A1 | 10/2006 | Thomas | |
| 2006/0237601 A1 | 10/2006 | Rinderer | |
| 2006/0243877 A1 | 11/2006 | Rippel | |
| 2006/0250788 A1 | 11/2006 | Hodge et al. | |
| 2006/0262536 A1 | 11/2006 | Nevers | |

(56) References Cited

U.S. PATENT DOCUMENTS

2006/0262545 A1 11/2006 Piepgras et al.
2007/0012847 A1 1/2007 Tai
2007/0035951 A1 2/2007 Tseng
2007/0121328 A1 5/2007 Mondloch et al.
2007/0131827 A1 6/2007 Nevers et al.
2007/0185675 A1 8/2007 Papamichael et al.
2007/0200039 A1 8/2007 Petak
2007/0206374 A1 9/2007 Petrakis et al.
2008/0002414 A1 1/2008 Miletich et al.
2008/0068847 A1 3/2008 Bedard
2008/0112168 A1 5/2008 Pickard et al.
2008/0112170 A1 5/2008 Trott
2008/0112171 A1 5/2008 Patti et al.
2008/0130308 A1 6/2008 Behr et al.
2008/0137347 A1 6/2008 Trott et al.
2008/0165545 A1 7/2008 O'Brien
2008/0170404 A1 7/2008 Steer et al.
2008/0186718 A1 8/2008 Magisano et al.
2008/0224008 A1 9/2008 Dal Ponte et al.
2008/0232116 A1 9/2008 Kim
2008/0247181 A1 10/2008 Dixon
2008/0285271 A1 11/2008 Roberge et al.
2009/0003009 A1 1/2009 Tessnow et al.
2009/0034261 A1 2/2009 Grove
2009/0080189 A1 3/2009 Wegner
2009/0086484 A1 4/2009 Johnson
2009/0097262 A1 4/2009 Zhang et al.
2009/0135613 A1 5/2009 Peng
2009/0141500 A1 6/2009 Peng
2009/0141506 A1 6/2009 Lan et al.
2009/0141508 A1 6/2009 Peng
2009/0147517 A1 6/2009 Li
2009/0161356 A1 6/2009 Negley et al.
2009/0237924 A1 9/2009 Ladewig
2009/0280695 A1 11/2009 Sekela et al.
2009/0283292 A1 11/2009 Lehr
2009/0290343 A1 11/2009 Brown et al.
2010/0014282 A1 1/2010 Danesh
2010/0033095 A1 2/2010 Sadwick
2010/0061108 A1 3/2010 Zhang et al.
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1 6/2010 Cogliano et al.
2010/0155497 A1 6/2010 Hagaman
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1 11/2010 Janik et al.
2010/0284185 A1 11/2010 Ngai
2010/0302778 A1 12/2010 Dabiet et al.
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich, III et al.
2011/0134651 A1 6/2011 Berman
2011/0140633 A1 6/2011 Archenhold
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2011/0285314 A1 11/2011 Carney et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0266449 A1 10/2012 Krupa
2012/0268688 A1 10/2012 Sato et al.
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0016864 A1 1/2013 Ivey et al.
2013/0033872 A1 2/2013 Randolph et al.
2013/0050994 A1 2/2013 Pieper
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0163254 A1 6/2013 Chang et al.
2013/0170232 A1 7/2013 Park et al.
2013/0170233 A1 7/2013 Nezu et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0294084 A1 11/2013 Kathawate et al.
2013/0301252 A1 11/2013 Hussell et al.
2013/0322062 A1 12/2013 Danesh
2013/0322084 A1 12/2013 Ebisawa
2013/0335980 A1 12/2013 Nakasuji et al.
2014/0029262 A1 1/2014 Maxik et al.
2014/0036497 A1 2/2014 Hussel et al.
2014/0049957 A1 2/2014 Goelz et al.
2014/0063776 A1 3/2014 Clark et al.
2014/0071679 A1 3/2014 Booth
2014/0071687 A1 3/2014 Tickner et al.
2014/0140490 A1 5/2014 Roberts et al.
2014/0063818 A1 6/2014 Randolph et al.
2014/0233246 A1 8/2014 Lafreniere et al.
2014/0254177 A1 9/2014 Danesh
2014/0268836 A1 9/2014 Thompson
2014/0268869 A1 9/2014 Blessitt et al.
2014/0299730 A1 10/2014 Green et al.
2014/0313775 A1 10/2014 Myers et al.
2014/0321122 A1 10/2014 Domagala et al.
2014/0347848 A1 11/2014 Pisavadia et al.
2015/0009676 A1 1/2015 Danesh
2015/0029732 A1 1/2015 Hatch
2015/0078008 A1 3/2015 He
2015/0085500 A1 3/2015 Cooper et al.
2015/0092449 A1 4/2015 Demuynck et al.
2015/0131301 A1 5/2015 Ho
2015/0138779 A1 5/2015 Livesay et al.
2015/0153635 A1 6/2015 Chen et al.
2015/0184837 A1 7/2015 Zhang et al.
2015/0198324 A1 7/2015 O'Brien et al.
2015/0219317 A1 8/2015 Gatof et al.
2015/0233556 A1 8/2015 Danesh
2015/0241039 A1 8/2015 Fryzek
2015/0263497 A1 9/2015 Korcz et al.
2015/0276185 A1 10/2015 Bailey et al.
2015/0308662 A1 10/2015 Vice et al.
2015/0345761 A1 12/2015 Lawlor
2015/0362159 A1 12/2015 Ludyjan
2016/0084488 A1 3/2016 Wu et al.
2016/0209007 A1 7/2016 Belmonte et al.
2016/0230969 A1 8/2016 Pelletier et al.
2016/0238225 A1 8/2016 Doust
2016/0308342 A1 10/2016 Witherbee et al.
2016/0312987 A1 10/2016 Danesh
2016/0348860 A1 12/2016 Danesh
2016/0348861 A1 12/2016 Bailey et al.
2016/0366738 A1 12/2016 Boulanger et al.
2017/0003007 A1 1/2017 Wronski

(56) References Cited

U.S. PATENT DOCUMENTS

| | | | |
|---|---|---|---|
| 2017/0045213 | A1 | 2/2017 | Williams et al. |
| 2017/0059135 | A1 | 3/2017 | Jones |
| 2017/0138576 | A1 | 5/2017 | Peng et al. |
| 2017/0138581 | A1 | 5/2017 | Doust |
| 2017/0167672 | A1 | 6/2017 | Stauner et al. |
| 2017/0167699 | A1 | 6/2017 | Schubert et al. |
| 2017/0198896 | A1 | 7/2017 | May |
| 2017/0284616 | A1 | 10/2017 | Coakley et al. |
| 2017/0307188 | A1 | 10/2017 | Oudina et al. |
| 2017/0307198 | A1 | 10/2017 | Shah et al. |
| 2018/0112857 | A1 | 4/2018 | Wronski et al. |
| 2018/0119907 | A1 | 5/2018 | O'Brien et al. |
| 2018/0142871 | A1 | 5/2018 | Morales |
| 2018/0216809 | A1 | 8/2018 | Cohen |
| 2018/0224095 | A1 | 8/2018 | Cohen |
| 2018/0283677 | A1 | 10/2018 | Cohen |
| 2019/0032874 | A1 | 1/2019 | Bonnetto et al. |
| 2019/0041050 | A1 | 2/2019 | Cairns et al. |
| 2019/0049080 | A1 | 2/2019 | Danesh |
| 2019/0063701 | A1 | 2/2019 | Lotfi et al. |
| 2019/0063724 | A1 | 2/2019 | Vice et al. |
| 2019/0093836 | A1 | 3/2019 | Danesh |
| 2019/0195475 | A1 | 6/2019 | Jones |
| 2019/0249852 | A1 | 8/2019 | Kim |
| 2020/0182420 | A1 | 6/2020 | Cohen et al. |
| 2020/0291652 | A1 | 9/2020 | Shen |
| 2020/0355334 | A1 | 11/2020 | Shen et al. |
| 2020/0393118 | A1 | 12/2020 | Danesh et al. |
| 2021/0010647 | A1 | 1/2021 | Danesh et al. |
| 2021/0010663 | A1 | 1/2021 | Nikooyan et al. |
| 2021/0033268 | A1 | 2/2021 | Danesh |
| 2021/0080081 | A1 | 3/2021 | Cohen |
| 2021/0080084 | A1 | 3/2021 | Danesh et al. |
| 2021/0222845 | A1 | 7/2021 | Kopitzke et al. |
| 2021/0254812 | A1 | 8/2021 | Danesh et al. |
| 2021/0364139 | A1 | 11/2021 | Danesh |
| 2022/0018522 | A1 | 1/2022 | Kopitzke et al. |
| 2022/0018523 | A1 | 1/2022 | Vinh et al. |
| 2022/0018525 | A1 | 1/2022 | Danesh |
| 2022/0049841 | A1 | 2/2022 | Young et al. |
| 2022/0082233 | A1 | 3/2022 | Kopitzke et al. |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 2406574 | Y | 11/2000 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 101859057 | A | 10/2010 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 101498411 | B | 11/2013 |
| CN | 203273663 | U | 11/2013 |
| CN | 203297980 | U | 11/2013 |
| CN | 203628464 | U | 12/2013 |
| CN | 203641919 | U | 6/2014 |
| CN | 204120631 | U | 1/2015 |
| CN | 204300818 | U | 4/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 206130742 | U | 4/2017 |
| CN | 103154606 | B | 5/2017 |
| CN | 206222112 | U | 6/2017 |
| CN | 107013845 | A | 8/2017 |
| CN | 107084343 | A | 8/2017 |
| DE | 9109828 | U1 | 2/1992 |
| DE | 199 47 208 | | 5/2001 |
| EP | 1 589 289 | | 10/2005 |
| EP | 1 672 155 | A1 | 6/2006 |
| EP | 1688663 | | 8/2006 |
| EP | 2 095 938 | A1 | 2/2008 |
| EP | 2 306 072 | A1 | 4/2011 |
| EP | 2 453 169 | A2 | 5/2012 |
| EP | 2 193 309 | B1 | 7/2012 |
| EP | 2 735 787 | A1 | 5/2014 |
| EP | 3 104 024 | A1 | 12/2016 |
| GB | 2325728 | | 12/1998 |
| GB | 2427020 | A | 12/2006 |
| GB | 2466875 | | 7/2010 |
| GB | 2471929 | | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| KR | 1020110008796 | A | 1/2011 |
| KR | 1020120061625 | A | 6/2012 |
| MX | 2011002947 | A | 9/2011 |
| TW | 474382 | U | 1/2002 |
| WO | WO 2013/128896 | A1 | 9/2013 |
| WO | WO 2015/000212 | A1 | 1/2015 |
| WO | WO 2016152166 | A2 | 9/2016 |

OTHER PUBLICATIONS

Acrich COB Zhaga Module, Product Description, Seoul Semiconductor, Nov. 11, 2016, 39 pages.

<https://www.zhagastandard.org/books/book18/>, Mar. 2017, 5 pages. Accessed on May 14, 2018.

BXUV.GuideInfo, Fire Resistance Ratings—ANSI/UL 263, UL Online Certifications Directory, last updated Nov. 3, 2016, 27 pages.

CEYY.GuideInfo, Outlet Boxes and Fittings Certified for Fire Resistance, UL Online Certifications Directory, last updated May 16, 2013, 2 pages.

Canadian Office Action dated Dec. 23, 2013 from Canadian Application No. 2,778,581, 3 pages.

Canadian Office Action dated Mar. 22, 2016 from Canadian Application No. 2,879,629, 4 pages.

Canadian Office Action dated Dec. 6, 2016 from Canadian Application No. 2,879,629, 3 pages.

Canadian Office Action dated Mar. 9, 2017 from Canadian Application No. 2,931,588, 5 pages.

Canadian Office Action dated Feb. 1, 2016 from Canadian Application No. 2,879,486, 5 pages.

Canadian Office Action dated Jun. 12, 2017 from Canadian Application No. 2,927,601, 4 pages.

Canadian Office Action dated Aug. 11, 2017 from Canadian Application No. 2,941,051, 4 pages.

Cree LED Lamp Family Sales Sheet—Better light is beautiful light , Apr. 24, 2017, 2 pages.

DME Series Installation Instructions, Oct. 18, 2011, 2 pages.

DMF, Inc., "dmfLighting: LED Recessed Lighting Solutions," Info sheets, Mar. 15, 2012, 4 pages.

DMF, Inc., "dmfLighting: LED Recessed Downlighting," DRD2 Product Brochure, Oct. 23, 2014, 50 pages.

(56) References Cited

OTHER PUBLICATIONS

DMF, Inc., "dmfLighting: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED—only (Non-Screw Based), Recessed Fixture, p. 4, Oct. 20, 2009, 4 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.
Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/Ul_outletboxes.pdf, Apr. 2007, 2 pages.
Notice of Allowance mailed Sep. 21, 2018 from U.S. Appl. No. 29/645,941, 5 pages.
"Advanced LED Solutions," Imtra Marine Lighting. Jun. 17, 2011. 39 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," Elco Lighting. Sep. 2018. 1 page.
"LED Undercabinet Pocket Guide," Elco Lighting. Nov. 2, 2016. 12 pages.
"Versi LED Mini Flush," Lithonia Lghting. Sep. 2013. 6 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
OneFrame Recessed LED Downlight. Dmflighting.com. Published Jun. 6, 2018. Retrieved at https://www.dmflighting.com/product/oneframe on Jun. 6, 2018. 11 pages.
Notice of Allowance mailed Oct. 9, 2018 from U.S. Appl. No. 29/653,142, 7 pages.
International Search Report and Written Opinion in PCT/US2018/048357 mailed Nov. 14, 2018, 13 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
International Search Report and Written Opinion in International Patent Application No. PCT/US18/39048 mailed Dec. 14, 2018. 24 pages.
Notice of Allowance mailed Jan. 2, 2019 from U.S. Appl. No. 29/541,565, 6 pages.
RACO 4 i+A882:C958n. Octagon Welded Concrete Ring, 3-½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
Notice of Allowance mailed Feb. 8, 2019 from U.S. Appl. No. 29/541,565, 5 pages.
Non-Final Office Action mailed Feb. 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.

(56) References Cited

OTHER PUBLICATIONS

Final Office Action mailed Mar. 15, 2019 from U.S. Appl. No. 15/132,875, 15 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
Raco Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Notice of Allowance mailed Jun. 12, 2019 from U.S. Appl. No. 16/016,040, 8 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1-½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
International Search Report and Written Opinion in International Patent Application No. PCT/US19/32281 mailed Aug. 2, 2019, 18 pages.
Notice of Allowance mailed Sep. 11, 2019 from U.S. Appl. No. 29/653,142, 6 pages.
Notice of Allowance mailed Sep. 19, 2019 from U.S. Appl. No. 16/016,040, 7 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065 , 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Corrected Notice of Allowance mailed Oct. 10, 2019 from U.S. Appl. No. 16/016,040, 2 pages.
Cree® LMR2 LED Module. Product Family Data Sheet Cree 2011. 3 pages.
Notice of Allowance mailed Oct. 16, 2019 from U.S. Appl. No. 15/132,875, 12 pages.
International Search Report and Written Opinion in International Patent Application No. PCT/US2019/036477 mailed Oct. 17, 2019, 15 pages.
ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Non-Final Office Action mailed Dec. 30, 2019 from U.S. Appl. No. 16/653,497, 8 pages.
Notice of Allowance mailed Feb. 5, 2020 from U.S. Appl. No. 15/901,738 , 8 pages.
Notice of Allowance mailed Feb. 5, 2020 from U.S. Appl. No. 29/678,482 , 13 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
Final Office Action mailed Mar. 17, 2020 for U.S. Appl. No. 29/653,142, 13 pages.
LED Book Pr ice Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
Non-Final Office Action mailed Apr. 2, 2020 for U.S. Appl. No. 16/522,275, 21 pages.
Notice of Allowance mailed May 18, 2020 from U.S. Appl. No. 15/901,738 , 7 pages.
Non-Final Office Action mailed May 20, 2020 for U.S. Appl. No. 15/688,266, 6 pages.

(56) References Cited

OTHER PUBLICATIONS

Non-Final Office Action mailed May 26, 2020 for U.S. Appl. No. 16/719,361, 10 pages.
Maxim Lighting International, "Wafer LED 7" RD 3000K Wall/ Flush Mount", undated.
Maxim Lighting International, "Convert LED Flush Mount", undated.
Maxim Lighting International, "Views of the Wafer Flush Mount", undated.
Maxim Lighting International, "Product/Drawing Specification Sheet", undated.
International Search Report and Written Opinion in PCT/US2020/ 017331 mailed Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/ 20871LEDD/20872LEDD. Dec. 16, 2019. 2 pages.
Model No. 20870LEDD-WH/ACR Infinite Specification Sheet. Access Lighting. Apr. 9, 2020. 1 page.
Notice of Allowance mailed Apr. 9, 2020 from U.S. Appl. No. 16/653,497, 7 pages.
Notice of Allowance mailed Jul. 10, 2020 from U.S. Appl. No. 29/694,475, 6 pages.
Corrected Notice of Allowability mailed Oct. 25, 2018 from U.S. Appl. No. 14/183,424, 3 pages.
Dmf DRD2 Recessed LED Downlight General Retrofit Junction Box Dated: Dec. 18, 2015 Downloaded Jul. 28, 2018, from https:// www.a Iconlighting.com/specsheets/DMF/DRD2-Junction-Box-Retrofit-Spec-Sheet .pdf, 6 pages.
Dmf DRD2 Recessed LED Downlight General New Construction 4", 5", 6" Aperture Dated: Aug. 31, 2016 Downloaded Jul. 28, 2018, from https://www. cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://ww w.alconlighting.com/dmf-drd2m.html (downloaded Jul. 28, 2018), 6 pages.
Ex Parte Quayle Office Action mailed Oct. 16, 2018 for U.S. Appl. No. 29/663,037, 7 pages.
Notice of Allowance mailed Nov. 19, 2018 from U.S. Appl. No. 29/663,037, 5 pages.
Notice of Allowance mailed Nov. 15, 2018 from U.S. Appl. No. 29/663,040, 5 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Notice of Allowance mailed Jul. 20, 2020 from U.S. Appl. No. 29/648,046, 5 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUlyp Jc0K80UHdDTI9C5m4BDzR3U87PRYV1NdQIBFxEWQ21_ 3otTCTqEkaAi_DEALw_wcB on Jul. 20, 2020. 1 page.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Canadian Office Action in Application No. 2931588 dated Aug. 13, 2020, 5 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/648,046, 5 pages.
Notice of Allowance mailed Oct. 27, 2020 from U.S. Appl. No. 29/694,475, 5 pages.
Notice of Allowance mailed Nov. 10, 2020 from U.S. Appl. No. 29/688,143, 6 pages.
Notice of Allowance mailed Nov. 10, 2020 from U.S. Appl. No. 29/688,172, 6 pages.
Non-Final Office Action mailed Nov. 30, 2020 from U.S. Appl. No. 17/000,702, 7 pages.
Notice of Allowance mailed Dec. 2, 2020 from U.S. Appl. No. 29/746,262, 6 pages.
International Search Report and Written Opinion in PCT/US2020/ 050767 mailed Dec. 9, 2020, 25 pages.
Non-Final Office Action mailed Dec. 16, 2020 from U.S. Appl. No. 17/080,080, 28 pages.
Canadian Office Action in Application No. 2941051 dated Dec. 8, 2020, 5 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Non-Final Office Action mailed Jan. 13, 2021 from U.S. Appl. No. 17/085,636, 14 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http:// electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Thiele, Plastic Electrical Boxes Pros and Cons. Dated Jul. 1, 2019. Accessed at found at https://www.thespruce.com/plastic-electrical-boxes-pros-and-cons-1152405. 1 page.
"Electrical Box" reference dated Mar. 23, 2021. Accessed at https:// www.zoro.com/cantex-electrical-box-3-12-in-rouond-20-cu-in-ez20cnr-/i/G1823376/. 1 page.
Notice of Allowance mailed May 17, 2021 from U.S. Appl. No. 15/688,266, 9 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 5, 2021 from U.S. Appl. No. 17/085,636, 8 pages.
Notice of Allowance mailed May 14, 2021 from U.S. Appl. No. 16/881,686, 8 pages.
Notice of Allowance mailed May 24, 2021 from U.S. Appl. No. 29/688,143, 6 pages.

(56) References Cited

OTHER PUBLICATIONS

Notice of Allowance mailed May 24, 2021 from U.S. Appl. No. 29/688,172, 6 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Chinese Office Action and English Translation Thereof in Chinese Patent Application No. 201880088009.9 dated Jun. 30, 2021, 18 pages.
Notice of Allowance mailed Jul. 21, 2021 from U.S. Appl. No. 17/318,13 pages.
Supplemental Notice of Allowance mailed Aug. 13, 2021 1 from U.S. Appl. No. 16/779,824, 3 pages.
Supplemental Notice of Allowance mailed Aug. 19, 2021 1 from U.S. Appl. No. 17/318,193, 4 pages.
Notice of Allowance mailed Aug. 20, 2021 1 from U.S. Appl. No. 29/764,875, 5 pages.
Notice of Allowance mailed Sep. 16, 2021 from U.S. Appl. No. 16/779,865, 9 pages.
Non-Final Office Action mailed Oct. 18, 2021 1 from U.S. Appl. No. 29/696,830, 8 pages.
Petition for Inter Partes Review of U.S. Pat. No. 9,964,266 Pursuant to 37 C.F.R. § 42.100 et seq. *AMP Plus Inc. dbd ELCO Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, Pier Lighting Research Program: Project 2.3 Low-profile LED Luminaires Final Report (Prepared by Lighting Research Center, Jan. 2005) ("Pier LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, Caliper Benchmark Report: Performance of Incandescent A-Type and Decorative Lamps and LED Replacements (prepared by Pacific National Laboratory, Nov. 2008) ("Caliper 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, Caliper Application Summary Report 16: LED BR30 and R30 Lamps (prepared by Pacific Northwest National Laboratory, Jul. 2012) ("Caliper 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navegator *AMP Plus, Inc. d/b/a Elco Lighting et al* v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd Elco Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a ELCO Lighting et al* v. *DMF, Inc.* PTAB-IPR2019-01500. Downloaded Mar. 25, 2020. 3 pages.
Civil Action No. 2:18-cv-07090. Complaint For Infringement And Unfair Competition. *DMF, Inc.* v. *AMP Plus, Inc. d/b/a Elco Lighting*. 52 pages. Dated Aug. 15, 2018.
Docket Listing in Civil Action No. 2:18-cv-07090. *DMF, Inc.* v. *AMP Plus, Inc. d/b/a Elco Lighting et al* CDCA-2-18-cv-07090. Downloaded on Mar. 25, 2020. 39 pages.
Civil Action No. 2:19-cv-4519.Complaint For Patent Infringement. *DMF, Inc.* v. *AMP Plus, Inc. d/b/a ELCO Lighting*. 52 pages dated May 22, 2019. 23 pages.
Docket Listing in Civil Action No. 2:19-cv-4519. *DMF Inc* v. *AMP Plus, Inc. d/b/a Elco Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant To 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.

(56) References Cited

OTHER PUBLICATIONS

Declaration of Eric Bretschneider, Ph.D In Support of Amp Plus, Inc.'s Opposition to DMF, Inc.'s Motion for Partial Summary Judgment in Civil Action No. 2:18-cv-07090-CAS-GJS filed Feb. 10, 2020. 210 pages.
Plaintiff DMF's Reply in Support Of Motion For Partial Summary Judgment in Civil Action No. 2:18-cv-07090-CAS-GJS filed Feb. 18, 2020. 33 pages.
Declaration of James R. Benya In Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Jan. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. Eye LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.
Cree LMH2 LED Modules Design Guide. Cree 2011-2015, 23 pages.
Brochure of Elco EL49A, EL49ICA, EL49RA modules. ELCO Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS. 37 pages.
Defendant AMP Plus, Inc. D/B/A Elco Lighting's Supplemental Responses to Plaintiff DMF, Inc.'s First Set of Interrogatories (Nos. 1-16) in Civil Action No. 2:19-CV-4519-CAS, Redacted. 13 pages.
Final Written Decision in IPR2019-01094 dated Nov. 19, 2020, 58 pages.
U.S. Appl. No. 14/183,424, filed Feb. 18, 2014, Danesh.
U.S. Appl. No. 14/726,064, filed May 29, 2015, Bailey et al.
U.S. Appl. No. 15/132,875, filed Apr. 19, 2016, Danesh.
U.S. Appl. No. 15/167,682, filed May 27, 2016, Bailey et al.
U.S. Appl. No. 14/942,937, filed Nov. 16, 2015, Peng et al.
U.S. Appl. No. 15/637,742, filed Jun. 29, 2017, Kopitzke, IV.
U.S. Appl. No. 15/688,266, filed Aug. 28, 2017, Lofti et al.
U.S. Appl. No. 15/853,400, filed Dec. 22, 2017, Kashani.
U.S. Appl. No. 15/901,738, filed Feb. 21, 2018, Danesh.
U.S. Appl. No. 15/947,065, filed Apr. 6, 2018, Danesh.
U.S. Appl. No. 16/016,040, filed Jun. 22, 2018, Danesh.
U.S. Appl. No. 16/200,393, filed Nov. 26, 2018, Danesh.
U.S. Appl. No. 29/638,259, filed Feb. 26, 2018, Danesh.
U.S. Appl. No. 29/541,565, filed Oct. 5, 2015, Peng.
U.S. Appl. No. 29/645,941, filed Apr. 30, 2018, Danesh et al.
U.S. Appl. No. 29/653,142, filed Jun. 11, 2018, Danesh et al.
U.S. Appl. No. 29/664,471, filed Sep. 25, 2018, Danesh et al.
U.S. Appl. No. 29/678,478, filed Jan. 29, 2019, Danesh et al.
U.S. Appl. No. 29/678,482, filed Jan. 29, 2019, Danesh et al.
U.S. Appl. No. 29/683,730, filed Mar. 15, 2019, Danesh et al.
U.S. Appl. No. 29/694,475, filed Jun. 11, 2019, Peng et al.
U.S. Appl. No. 16/653,497, filed Oct. 15, 2019, Danesh et al.
U.S. Appl. No. 29/711,198, filed Nov. 29, 2019, Danesh et al.
U.S. Appl. No. 16/690,970, filed Nov. 21, 2019, Nikooyan et al.
U.S. Appl. No. 16/719,361, filed Dec. 18, 2019, Danesh et al.
U.S. Appl. No. 16/522,275, filed Jul. 25, 201, Danesh.
U.S. Appl. No. 16/725,606, filed Dec. 23, 2019, Bailey et al.
U.S. Appl. No. 29/648,046, filed May 17, 2018, Williams.
U.S. Appl. No. 16/779,824, filed Feb. 3, 2020, Danesh.
U.S. Appl. No. 16/779,865, filed Feb. 3, 2020, Danesh et al.
U.S. Appl. No. 29/688,172, filed Apr. 18, 2019, Danesh et al.
U.S. Appl. No. 29/688,143, filed Apr. 18, 2019, Danesh et al.
U.S. Appl. No. 16/883,144, filed May 26, 2020, Nikooyan et al.
U.S. Appl. No. 29/696,830, filed Jul. 1, 2019, Kopitzke.
U.S. Appl. No. 16/182,481, filed Nov. 6, 2018, Kopitzke.
U.S. Appl. No. 29/762,016, filed Dec. 14, 2020, Williams et al.
U.S. Appl. No. 17/118,742, filed Dec. 11, 2020, Danesh et al.
U.S. Appl. No. 29/752,046, filed Sep. 24, 2020, Peng et al.
U.S. Appl. No. 17/229,668, filed Apr. 13, 2021, Shen.
U.S. Appl. No. 17/318,193, filed May 12, 2021, Danesh et al.
U.S. Appl. No. 17/080,080, filed Oct. 26, 2020, Danesh.
U.S. Appl. No. 17/220,779, filed Apr. 1, 2021, Kopitzke et al.
U.S. Appl. No. 17/395,522, filed Aug. 6, 2021, Danesh.
U.S. Appl. No. 17/385,766, filed Jul. 26, 2021, Kopitzke.
U.S. Appl. No. 17/384,564, filed Jul. 23, 2021, Kopitzke et al.
U.S. Appl. No. 17/379,748, filed Jul. 19, 2021, Young et al.
U.S. Appl. No. 17/379,489, filed Jul. 19, 2021, Vinh et al.
U.S. Appl. No. 17/378,214, filed Jul. 16, 2021, Kopitzke et al.
U.S. Appl. No. 17/374,674, filed Jul. 13, 2021, Danesh.
U.S. Appl. No. 17/234,421, filed Apr. 19, 2021, Danesh.
U.S. Appl. No. 29/764,875, filed Jan. 4, 2021, Danesh et al.
U.S. Appl. No. 29/759,492, filed Nov. 23, 2020, Danesh et al.
U.S. Appl. No. 17/099,650, filed Nov. 16, 2020, Danesh et al.
U.S. Appl. No. 29/757,754, filed Nov. 9, 2020, Danesh et al.
U.S. Appl. No. 17/473,934, filed Sep. 13, 2021, Danesh et al.
U.S. Appl. No. 29/467,026, filed Sep. 13, 2013, Danesh et al.
U.S. Appl. No. 14/823,410, filed Aug. 11, 2015, Williams et al.
U.S. Appl. No. 14/791,249, filed Jul. 2, 2015, Lee.
U.S. Appl. No. 15/158,538, filed May 18, 2016, Kashani.
U.S. Appl. No. 15/897,955, filed Feb. 15, 2018, Fardadi et al.
U.S. Appl. No. 29/648,937, filed May 24, 2018, Kopitzke.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
Non-Final Office Action mailed Feb. 16, 2022 from U.S. Appl. No. 29/743,066, 6 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144, 11 pages.

(56) References Cited

OTHER PUBLICATIONS

Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
Canadian Notice of Allowance dated Nov. 23, 2022 from Canadian Application No. 3,102,022, 1 Page.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470 , dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
Notice of Allowance Mailed Jun. 7, 2022 from U.S. Appl. No. 29/683,638, 7 pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 17, 2023 from U.S. Appl. No. 17/723,370, 5 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.
Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Aug. 31, 2023 from U.S. Appl. No. 17/379,489, 11 Pages.
Opinion from the Fed. Ct. of App. in *AMP Plus, Inc.* v. *DMF, Inc.* in case Nos. 2021-1595, 2021-1636 (Appeals from the PTAB in IPR2019-01094) decided on Nov. 10, 2022, 15 pages.
U.S. Appl. No. 17/666,441, filed Feb. 7, 2022, Danesh et al.
U.S. Appl. No. 29/663,037, filed Sep. 11, 2018, Danesh et al.
U.S. Appl. No. 29/663,040, filed Sep. 11, 2018, Danesh et al.
U.S. Appl. No. 29/746,262, filed Aug. 12, 2020, Danesh et al.
U.S. Appl. No. 29/820,189, filed Dec. 20, 2021, Danesh et al.
U.S. Appl. No. 17/902,469, filed Sep. 2, 2022, Danesh.
U.S. Appl. No. 16/881,686, filed May 22, 2020, Danesh et al.
U.S. Appl. No. 17/085,636, filed Oct. 30, 2020, Danesh et al.
U.S. Appl. No. 17/867,522, filed Jul. 18, 2022, Danesh et al.
U.S. Appl. No. 17/000,702, filed Aug. 24, 2020, Danesh.
U.S. Appl. No. 17/677,300, filed Feb. 22, 2022, Danesh.
U.S. Appl. No. 17/933,257, filed Sep. 19, 2022, Danesh et al.
U.S. Appl. No. 16/886,365, filed May 28, 2020, Shen.
U.S. Appl. No. 17/694,489, filed Mar. 14, 2022, Danesh et al.
U.S. Appl. No. 13/484,901, filed May 31, 2012, Danesh.
U.S. Appl. No. 17/902,474, filed Sep. 2, 2022, Danesh.
U.S. Appl. No. 29/743,066, filed Jul. 17, 2020, Young et al.
U.S. Appl. No. 17/723,370, filed Apr. 18, 2022, Young et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/582,921, filed Jan. 24, 2022, Kopitzke et al.
U.S. Appl. No. 17/826,847, filed May 27, 2022, Danesh.
U.S. Appl. No. 18/068,639, filed Dec. 20, 2022, Danesh et al.
U.S. Appl. No. 18/171,379, filed Feb. 20, 2023, Kopitzke et al.
U.S. Appl. No. 18/055,070, filed Nov. 14, 2022, Kumar.

* cited by examiner

ALTERNATE JUNCTION BOX AND ARRANGEMENT FOR LIGHTING APPARATUS

CROSS-REFERENCE TO RELATED APPLICATION(S)

The present application claims priority to U.S. application Ser. No. 15/688,266 filed Aug. 28, 2017, entitled "ALTERNATE JUNCTION BOX AND ARRANGEMENT FOR LIGHTING APPARATUS," which is incorporated by reference herein in its entirety.

TECHNICAL FIELD

The present embodiments relate generally to lighting, and more particularly to an apparatus for a downlight or ceiling lamp incorporating an LED lighting source.

BACKGROUND

The inventions of the present applicant such as those described in U.S. Pat. No. 9,581,302 and U.S. Patent Publ. Nos. 2017/0045213, 2016/0312987, 2016/0348861, 2016/0348860 and 2015/0276185, the contents of which are incorporated herein by reference in their entirety, have dramatically advanced the state of the art of lighting technology. However, opportunities for further improvements remain.

SUMMARY

Embodiments are directed to a lighting system including a junction box for accommodating a light source assembly, and which is configured to allow for additional components such as separate drivers or emergency ballasts to also be included in the lighting system together with the light source assembly. In embodiments, the junction box is mounted on a pan style frame. In some embodiments, the lighting system includes a test switch mounted on a trim piece that is accessible from below a ceiling in which the lighting system is installed, and which allows for an emergency power supply for the lighting system to be verified.

BRIEF DESCRIPTION OF THE DRAWINGS

The patent or application file contains at least one drawing executed in color. Copies of this patent or patent application publication with color drawing(s) will be provided by the Office upon request and payment of necessary fee.

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As set forth above, the present applicant has developed several innovations that have dramatically advanced the state of the art of lighting technology. For example, the innovation of U.S. Patent Publ. No. 2016/0312987 is directed to an outer casing and mounting hardware for a recessed lighting fixture that can allow a unified light source and driver module to be adjustably installed behind a ceiling (i.e. the outer casing housing the light source module can be adjustably mounted in different directions with respect to an opening in the ceiling). According to certain aspects, the present applicant has recognized that this and other innovations can be leveraged in certain ways, for example to allow for additional components such as separate drivers or emergency ballasts, to also be included in the light fixture along with the light source module.

Figure 1A:
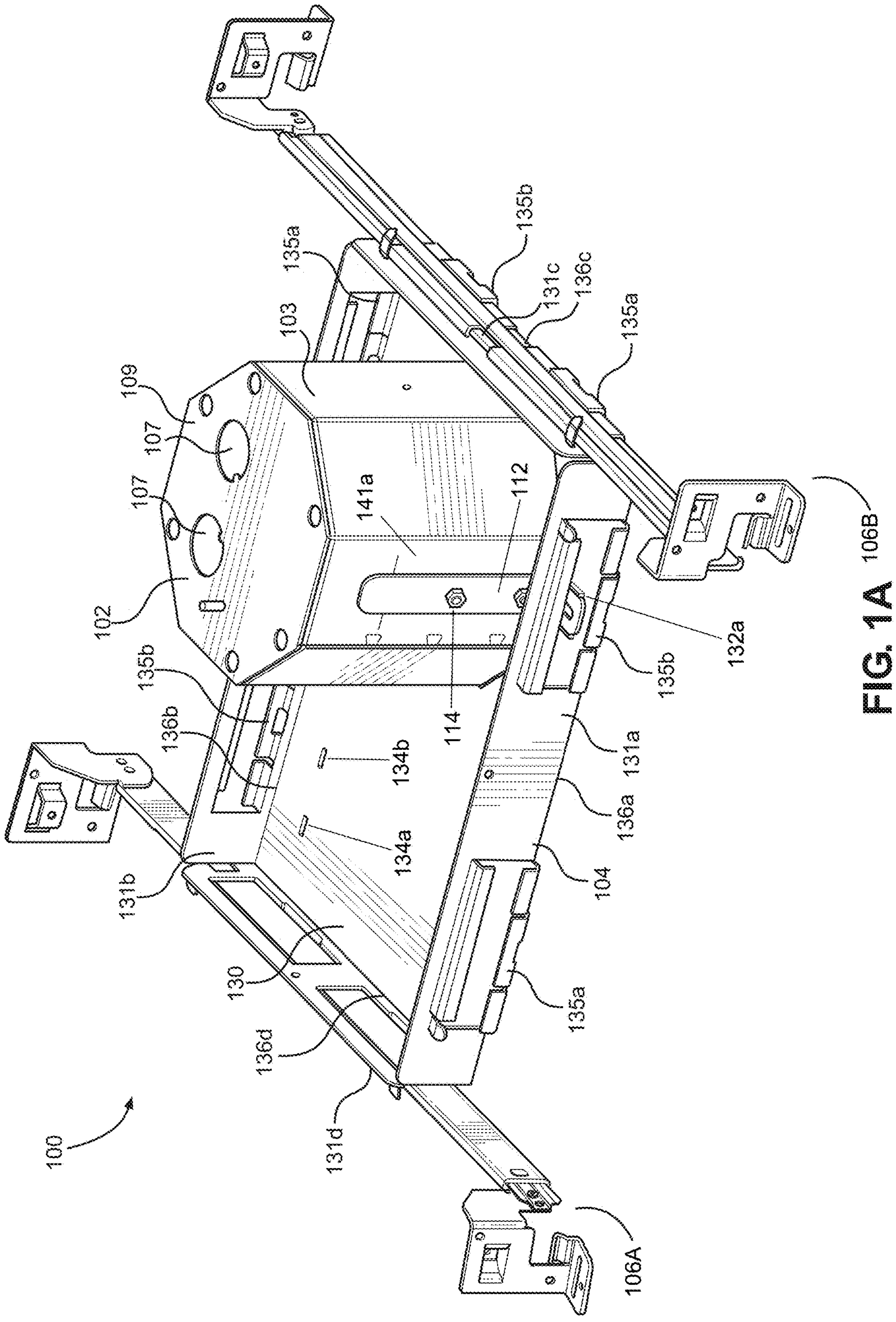
FIGS. 1A to 1C are various views of an example lighting system according to the embodiments.

In fulfillment of these and other aspects, FIG. 1A illustrates an example lighting system 100 according to the present embodiments.

As shown, lighting system 100 is comprised of a junction box 102 mounted on a frame 104. In embodiments, junction box 102 may be made of steel, stainless steel, aluminum, plastic, titanium, copper or nickel. Junction box 102 may be fire-resistant in that it has a fire rating of up to two hours without any need for modification, where the fire rating is described in the National Electrical Code (NEC) and by the Underwriters Laboratories (UL) such as specified in UL 263 Standard for Fire Tests of Building Construction and Materials. In other embodiments, lighting system 100 may include a standard 4×4 electrical junction box, which may or may not be fire rated. Moreover, although junction box 102 shown in the example of FIG. 1A as having an octagonal outer shape, this is not necessary. In other embodiments, junction box 102 may have any suitable shape, such as square, rectangle, pentagon, hexagon, heptagon, nonagon, or decagon, or having a rounded shape such as cylindrical, ellipsoid, frusto-conical, or otherwise curved shape. Example aspects of junction box 102 in some embodiments can be found in U.S. Patent Publ. No. 2016/0312987, the contents of which are incorporated herein by reference in their entirety.

Frame 104 is in the form of a pan or tray and may be comprised of steel, stainless steel, aluminum, plastic, titanium, copper or nickel. As further shown, frame 104 is attached to hangar bars 106A and 106B to allow the lighting system to be installed in a typical drop ceiling as will be described in more detail below. Moreover, as further shown, frame 104 is dimensioned to accommodate additional lighting system components other than junction box 102 according to additional aspects of other embodiments to be described in more detail below.

Figure 1B:
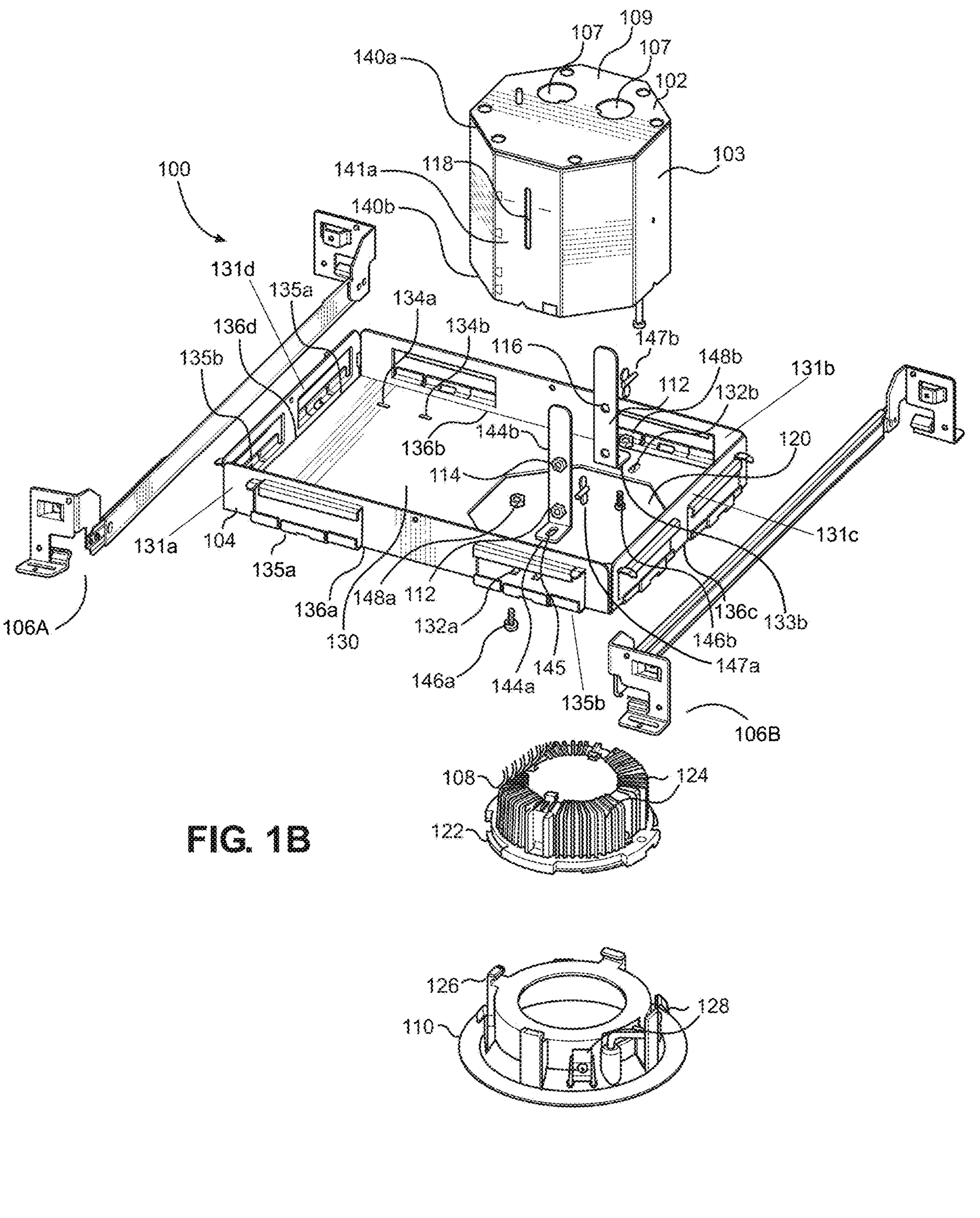
Figure 4A:
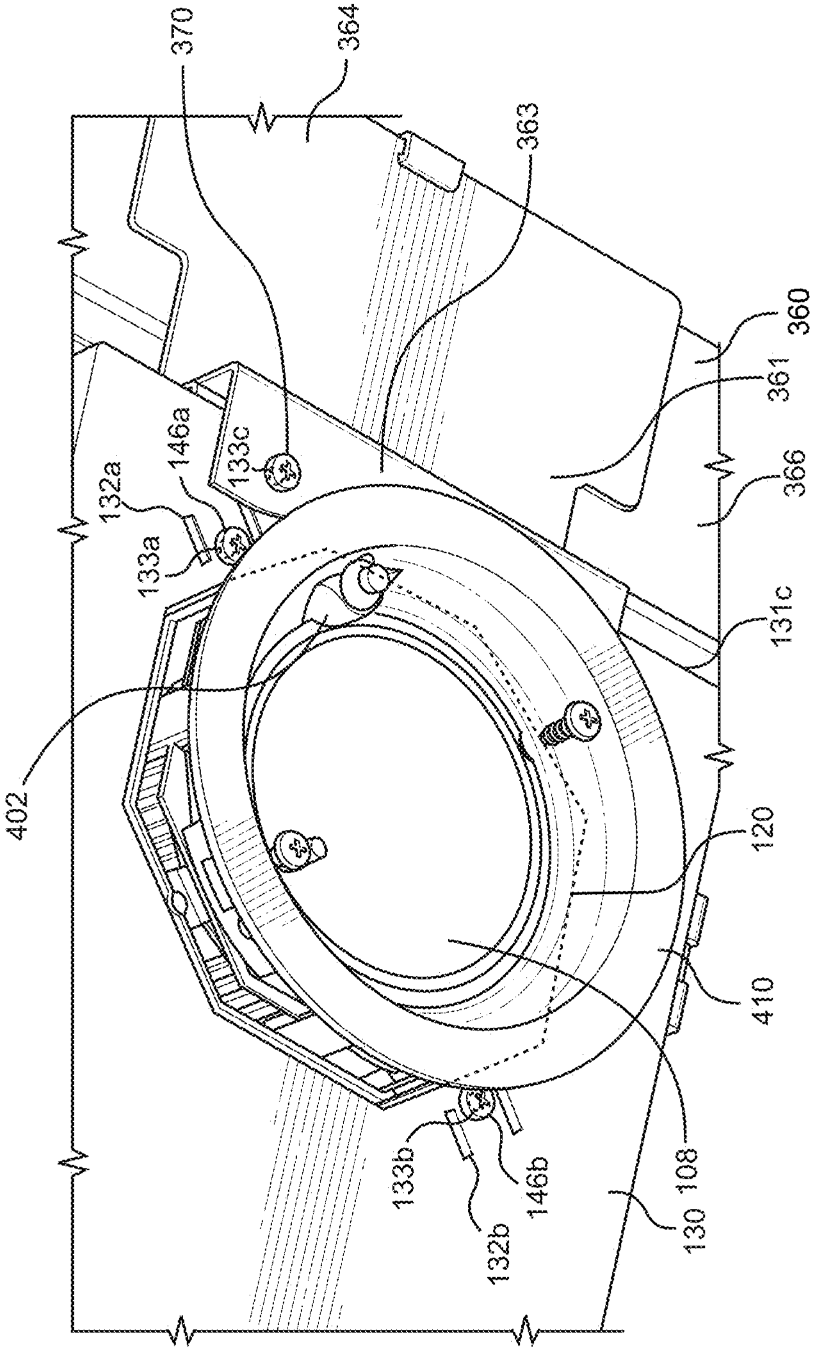
FIGS. 4A and 4B illustrates example emergency aspects of a lighting system such as that illustrated in FIG. 3.

FIG. 1B is an exploded view of example lighting system 100 according to the embodiments. FIGS. 1A and 1B show the frame 104 includes a bottom portion 130 shaped as a rectangle with side portions 131*a* and 131*b* formed along long edges 136*a* and 136*b* of the bottom portion 130, respectively. Side portions 131*c* and 131*d* formed along short edges 136*c* and 136*d*, respectively. Each of the side portions 131*a*-131*d* includes hanger bar guides 135*a* and 135*b*, which allow the respective pairs of hanger bars 106 to be mounted on either the long edges 136*a* and 136*b* or the short edges 136*c* and 136*d*. As shown in FIG. 1B, the bottom portion 130 of the frame 104 includes an opening 120 disposed closer to the short edge 136*c* than the short edge 136*d* to accommodate the junction box 102. The bottom portion 130 of the frame 104 further includes a pair of slots 134*a* and 134*b* to couple an external housing 261 (see FIG. 2) to the frame 104. The slots 134*a* and 134*b* are colinearly aligned and disposed closer to the short edge 136*d* than the short edge 136*c* as shown in FIG. 1B. FIG. 1B also shows the bottom portion 130 of the frame 104 includes two pairs of bracket guides 132*a* and 132*b* disposed near the opening 120 and opposite with respect to one another. The pairs of brackets guides 132*a* and 132*b* constrain corresponding L-shaped brackets 112 when coupling the L-shaped brackets 112 to the frame 104. FIG. 4A shows the bottom portion 130 of the frame 104 further includes fastener opening 133*a* disposed partially between the pair of bracket guides 132*a* and the opening 120 to receive a fastener 146*a*; FIG. 1B also shows this fastener 146*a* as well as a nut 148*a* to securely couple one L-shaped bracket 112 to the frame 104. Similarly, FIGS. 1B and 4A show the bottom portion 130 also includes a fastener opening 133*b* disposed partially between the pair of bracket guides 132*b* and the opening 120 to receive a fastener 146*b* and a nut 148*b* to securely couple the other L-shaped bracket 112 to the frame 104. FIG. 4A also shows the bottom portion 130 includes a fastener opening 133*c* disposed between the opening 120 and the short edge 136*c* to support a ballast support bracket 361.

The junction box 102 may have a side wall 103 that extends from and is joined at its upper edge (or upper end) 140*a* to a closed base end 109, which together define a cavity 105 therein. The side wall 103 may surround the cavity 105, with its lower edge (or lower end) 140*b* defining the perimeter of an opening 111 through which various components can be placed inside the cavity 105, including for example, a ring, the light source assembly 108, and the trim 110. The cavity 105 that is formed in the junction box 102 is larger than the outside dimensions of the light source assembly 108 such that the entirety of the light source assembly 108 fits into the cavity 105. The light source assembly 108 may or may not come into direct contact with the side wall 103 of the junction box 102.

The junction box 102 may have on its base end one or more knockouts 107 as shown. The knockouts 107 may be punched through and removed to leave an opening behind on the base end, for electrical wires to be inserted through the opening. One or more knockouts 107 may also have smaller openings in them (e.g., a slit, slot, etc., that is smaller than the opening that results when the knockout 107 has been removed from the base end) that may allow the electrical wires to be inserted through without the need to punch through the knockouts 107. The knockout 107 may be more than ½ inch in diameter. In one embodiment, one or more of the knockouts 107 allow for the installation therethrough of a non-metallic sheathed cable. One or more of the knockouts 107 may also be positioned on the side wall 103 of the junction box 102.

As can be seen in more detail in this view, junction box 102 is attached to frame 104 by a pair of brackets 112 and nuts 114 (e.g. wing nuts). Each bracket 112 is a L-shaped bracket with a first arm 144*a* and a second arm 144*b* oriented at a right angle with respect to the first arm 144*a*. The first arm 144*a* includes a fastener opening 145, which aligns with the fastener opening 133*a* (see FIG. 4A) to receive the screw fastener 146*a*. The second arm 144*b* includes a fastener opening 116 (also referred to as a through hole 116, see FIG. 1B), which aligns with the slot 118 on the junction box 102. Nuts 114 engage with screws (e.g., see wing fasteners 147*a* and 147*b* in FIG. 1B) that extend both through holes 116 of brackets 112 and slots 118 in housing 102 (e.g., see slots 118 formed on the first side 141*a* and the second side 141*b* of the side wall 103 in FIGS. 1B and 1C). With such slots 118 and corresponding fastening mechanisms 114 etc., junction box 102 may be slidably repositioned to extend through opening 120 of frame 104 as will be described in more detail below. Another aspect of the example illustrated fasteners between frame 104 and junction box 102 is that they allow for junction box 102 to be selectively removed from frame 104, for example for servicing or replacement of components.

As shown, lighting system 100 further includes light source assembly 108 and trim 110 that can be mounted together to housing 102. As will be described in more detail below, when assembled together, the lighting system 100 is designed to be positioned behind a ceiling or a wall such that the trim 110 extends outside a hole in the ceiling or wall (not shown) and rests flush against the exposed surface of the ceiling or wall.

In this example embodiments, light source assembly 108 is comprised of a housing that includes integrally formed flange portion 122 and fins 124. The housing may be composed of any thermally conductive material so as to help cool the light source assembly 108 during operation. For example, the housing of light source assembly 108 including integrally formed flange portion 122 and fins 124 may be comprised of injection molded thermally conductive plastic. In other embodiments, the housing may be made of aluminum alloys, copper, copper-tungsten pseudoalloy, AlSiC (silicon carbide in aluminum matrix), Dymalloy (diamond in copper-silver alloy matrix), E-Material (beryllium oxide in beryllium matrix), and/or other thermally conductive plastics or ceramics.

Although not shown in detail in FIG. 1B, light source assembly 108 in example embodiments can include an integrated driver such as an electronic circuit or device that supplies and/or regulates electrical energy to a light source and thus power the light source to emit light. This can include any type of power supply circuit, including one that includes power converters, rectifiers, power transistors and the like for delivering an appropriate alternating current (AC) or a direct current (DC) voltage to the light source. Upon receiving electricity, the power supply circuit may regulate current or voltage to supply a stable voltage or current within the operating parameters of the light source. In embodiments, the power supply circuit receives an input current from an electrical power wiring network of the building or structure in which the lighting system 100 is installed, and may drop the voltage of the input current to an acceptable level for the light source (e.g., from 120V-277V to 36V-48V). In these and other embodiments, junction box 102 may include appropriate wiring and other components to allow for such electrical connections. These electrical connections preferably include keyed or interlocking connectors (not shown) within junction box 102 that allow light source assembly 108 to receive power from the electrical power wiring network. Such keyed or interlocking connectors are further preferably configured to allow for manual connection or disconnection without the use of tools.

The light source in light source assembly 108 may be any electro-optical device or combination of devices for emitting light. For example, the light source may have one or more light emitting diodes (LEDs, such as an XLamp LED from Cree), organic light-emitting diode (OLEDs), or polymer light-emitting diode (PLEDs). An example embodiment of light source assembly 108 having an integrated driver that can be used in lighting system 100 of FIG. 1B is described in more detail in U.S. Patent Publication No. 2015/0009676, the contents of which are incorporated herein by reference in their entirety. It should be noted that an integrated driver is not necessary in all embodiments, as will become more apparent below.

In the illustrated example, trim 110 is attached to the flange portion 122 of light source assembly 108 by mutually engaging twist and lock mechanisms 126 built onto trim 110 and inner surface of flange portion 122. When trim 110 and light source assembly 108 are thus joined together, the attached components can then be installed into junction box 102 in a friction fit manner by clips 128 extending from trim 110.

Figure 1C:
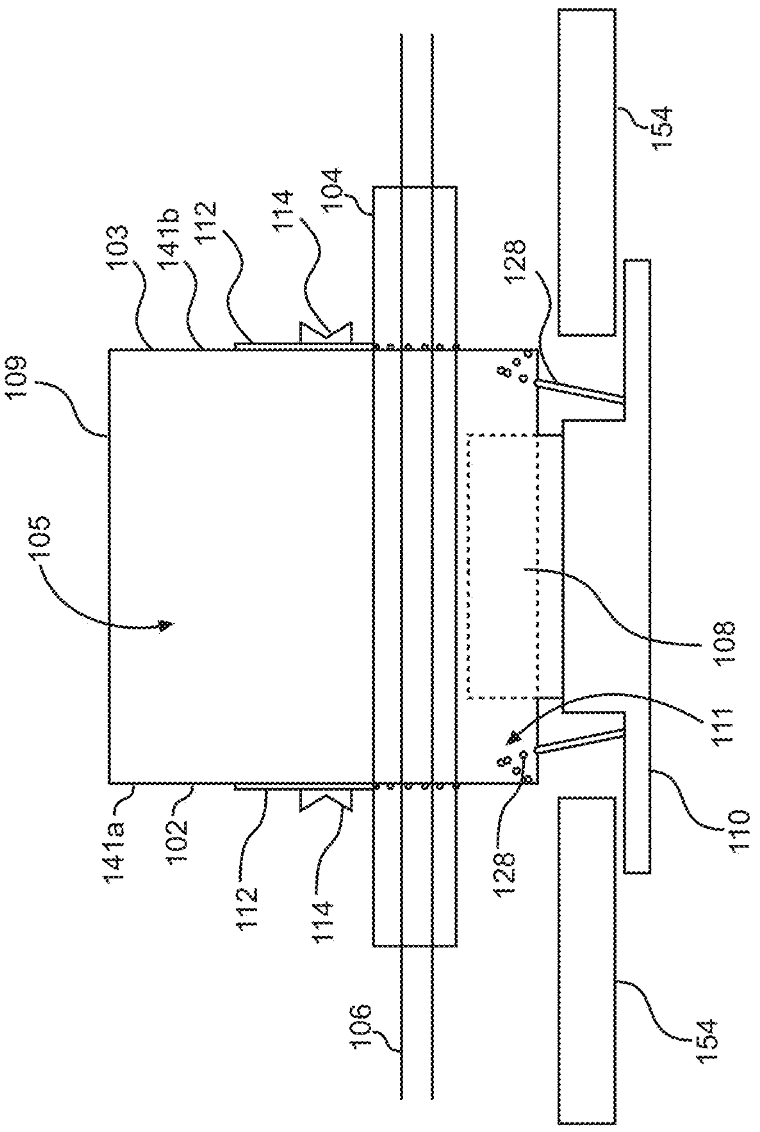

FIG. 1C illustrates aspects of how embodiments of lighting system 100 can be used to provide a downlight in a ceiling.

As shown, frame 104 of lighting system 100 is secured above an opening in ceiling 154 (e.g. to joists or other structures in a drop ceiling) by hanger bars 106. Junction box 102 is mounted to frame 104 above the opening of ceiling 154 by brackets 112, screws 147*a* and 147*b* and nuts 114. As described above, light source assembly 108 and trim 110 are coupled together via a twist and lock mechanism and these two components are jointly connected to junction box 102 using clips 128 on trim 110. When light source assembly 108 and trim 110 are thus secured to junction box 102, trim 110 is flush against the surface of ceiling 154, and trim 110 is the only portion of the lighting system 100 that extends outward from the surface of ceiling 154. As further described above, by virtue of slots 118 in junction box 102, junction box 102 can be slidably repositioned to allow trim 110 to be as flush as desirable against the surface of ceiling 154, or otherwise desirably positioned within the opening of ceiling 154, depending on the style and form of trim 110.

In addition to these aesthetically desirable aspects, additional functionally desirable aspects are made possible by lighting system 100 as well. For example, after installation of junction box 102 behind ceiling 154, light source assembly 108 and trim 110 can be freely installed or otherwise accessed from below the ceiling line, without needing to access the space above the ceiling line. For example, after installation into junction box 102, by manipulation of clips 128, light source assembly 108 and trim 110 can be removed. As described above, light source assembly 108 can further be manually disconnected from a power source when junction box 102 includes suitable electrical wiring connectors. After light source assembly 108 and trim 110 are removed, either or both of them can be serviced and replaced, all without the need for accessing junction box 102 or the space behind ceiling 154.

Figure 2:
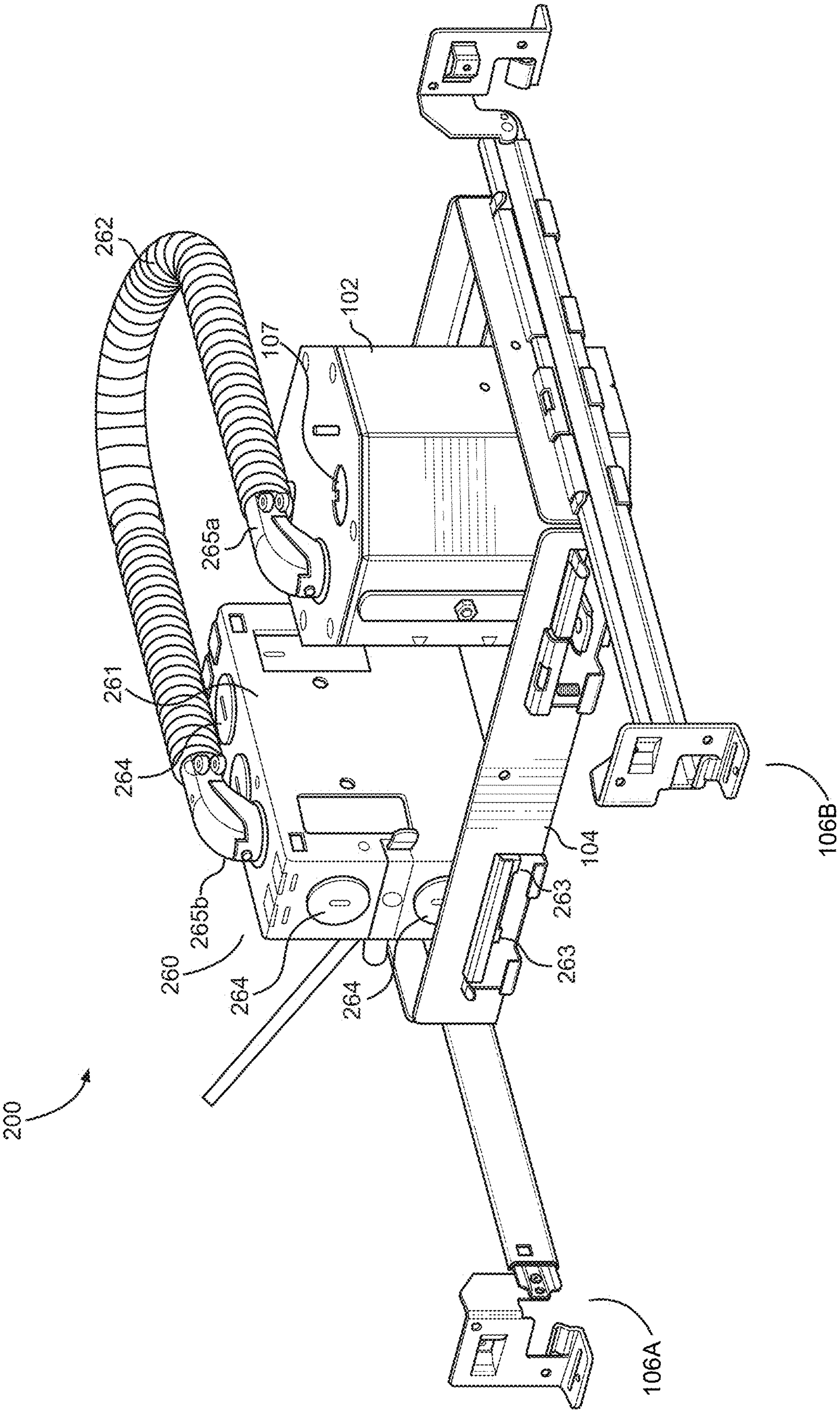
FIG. 2 illustrates another example lighting system according to the embodiments.

FIG. 2 illustrates another example of a lighting system 200 according to alternative embodiments.

As shown in this example, lighting system 200 includes many of the same components as lighting system 100, and so repeated descriptions thereof are not included here. Meanwhile, lighting system 200 further includes driver 260. This embodiment can be useful when light source assembly 118 (not shown) does not include a unified driver as described above in connection with lighting system 100. This can provide some benefits in some environments, such as lowering thermal extremes in connection with light source assembly 118, and providing for a distribution of heat among components 102, 260.

Similarly as described above, driver 260 can include any type of power supply circuit, including one that includes power converters, rectifiers, power transistors and the like for delivering an appropriate alternating current (AC) or a direct current (DC) voltage to the light source. Upon receiving electricity, the power supply circuit may regulate current or voltage to supply a stable voltage or current within the operating parameters of the light source in lighting assembly 118. In lighting system 200, driver 260 receives an input current from an electrical power wiring network of the building or structure in which the lighting system 200 is installed via junction box 102 and one or more wires in conduit 262. Driver 260 may drop the voltage of the input current to an acceptable level for the light source (e.g., from 120V-277V to 36V-48V) and provide the regulated voltage back to the light source in junction box 102 via one or more additional wires in conduit 262.

In embodiments, driver 260 may include an external housing 261 made of galvanized steel, injection molded plastic, titanium, aluminum, stainless steel, copper or nickel. As such, similarly to junction box 102, driver 260 may be fire-resistant in that it has a fire rating of up to two hours without any need for modification, where the fire rating is described in the National Electrical Code (NEC) and by the Underwriters Laboratories (UL) such as specified in UL 263 Standard for Fire Tests of Building Construction and Materials. FIG. 2 further shows the external housing 261 includes a plurality of knockouts 264 and a plurality of tabs 263 inserted through corresponding slots formed on the bottom portion 130 of the frame 104 (e.g., slots 134*a* and 134*b* as shown in FIG. 1B). FIG. 2 also shows the conduit 262 has a first end 265*a* coupled to the junction box 102 via an opening formed by the removal of one of the knockouts 107 and a second end 265*b* coupled to the external housing 261 via an opening formed by the removal of one of the knockouts 264. In these and other embodiments, conduit 262 may be flexible metal conduit having a UL rating.

Figure 3:
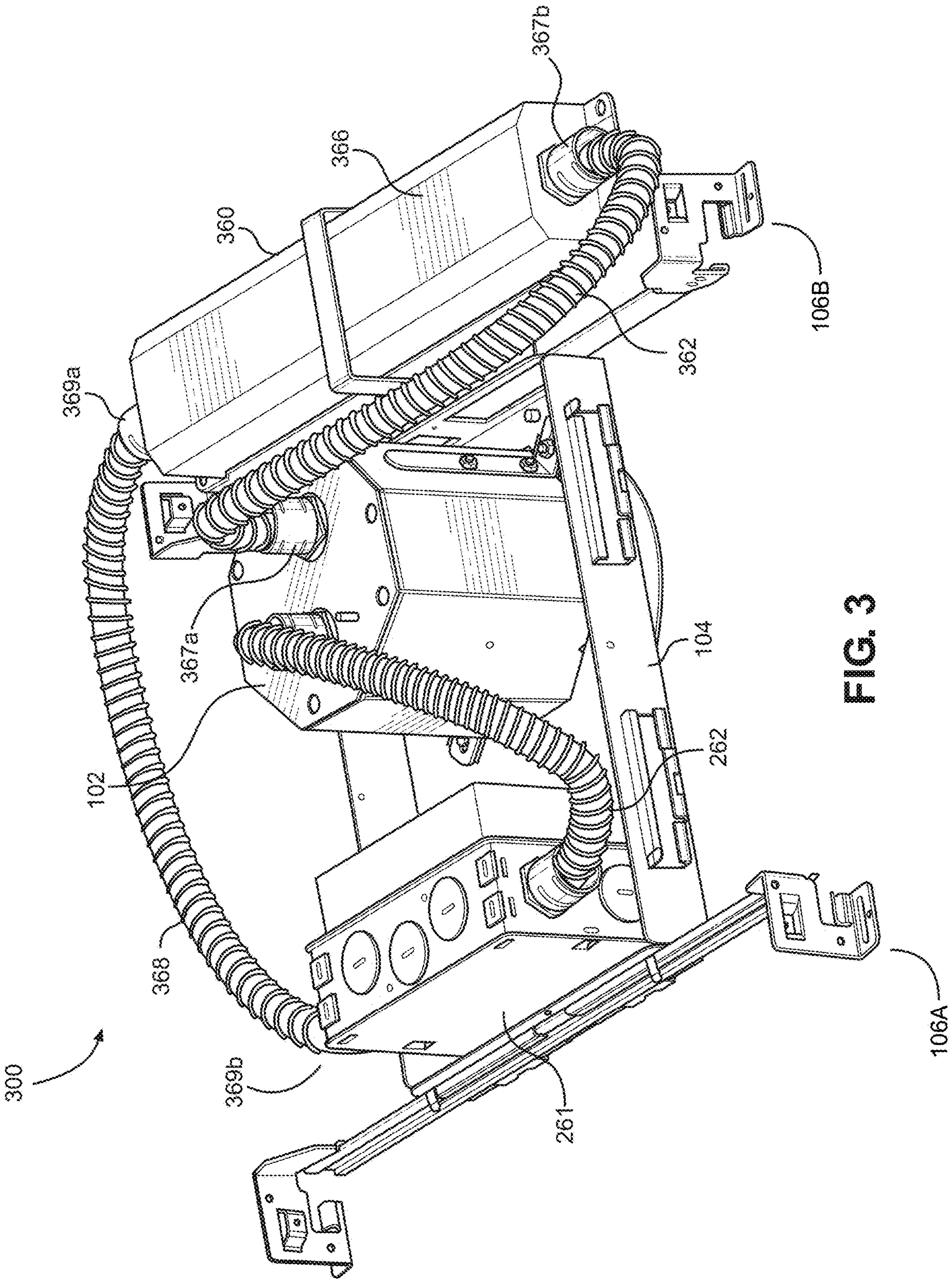
FIG. 3 illustrates another example lighting system according to the embodiments.

FIG. 3 illustrates another example of a lighting system 300 according to alternative embodiments.

As shown in this example, lighting system 300 includes many of the same components as lighting systems 100 and 200, and so repeated descriptions thereof are not included here. Meanwhile, lighting system 300 further includes an emergency ballast 360.

In embodiments, emergency ballast 360 includes batteries that allow for the continued operation of the light source in light source assembly 108 when electrical power in the building in which lighting system 300 is installed is interrupted or otherwise absent. In these and other embodiments, driver 260 and/or emergency ballast 360 may include relays, switches and similar circuitry for automatically switching the supply of electrical power to light source assembly 108 to be provided from the batteries instead of the building electrical power network during such interruptions via conduit 362. Additionally or alternatively, driver 260 and/or emergency ballast 360 may include converters, regulators, and similar circuitry for automatically charging the batteries via conduit 368 using power received from the building electrical power network when it is not interrupted. The circuitry described herein can be implemented using many ways known to those skilled in the art, and so details thereof will be omitted here for sake of clarity of the invention.

Similar to driver 260, in embodiments, emergency ballast 360 may include an external housing 366 made of galvanized steel, injection molded plastic, or ceramic. As such, similarly to junction box 102 and driver 260, emergency ballast 360 may be fire-resistant in that it has a fire rating of up to two hours without any need for modification, where the fire rating is described in the National Electrical Code (NEC) and by the Underwriters Laboratories (UL) such as specified in UL 263 Standard for Fire Tests of Building Construction and Materials. FIG. 4A shows the ballast 360 is coupled to the frame 104 via a ballast support bracket 361. The ballast support bracket 361 includes a base portion 363 coupled to the bottom portion 130 of the frame 104 via a fastener 370 inserted, in part, through the fastener opening 133*c* on the bottom portion 130. In FIG. 4A, the trim 110 obscures view of a second fastener inserted through a second fastener opening on the bottom portion 130 of the frame 104 to couple the ballast support bracket 361 to the frame 104. The ballast support bracket 361 further includes a platform 364 connected to the base portion 363 that extends laterally from the short edge 131*c* of the frame 104 to support the external housing 366. FIG. 3 also shows the conduit 362 has a first end 367*a* coupled to the junction box 102 via an opening formed by the removal of one of the knockouts 107 and a second end 367*b* coupled to the external housing 366. FIG. 3 also shows the conduit 368 has a first end 369*a* coupled to the external housing 366 and a second end 369*b* coupled to the external housing 261. In these and other embodiments, conduits 362 and 368 may be flexible metal conduit having a UL rating.

Although not shown in detail in FIG. 3, frame 104 of lighting system 300 can include a release mechanism(s) for allowing emergency ballast 360 and/or driver 260 to be easily detached from frame 104 for servicing and/or replacement for example.

FIG. 4A shows an example emergency switch that can be used in together with a lighting system 300 such as that shown in FIG. 3 and described above.

As shown in this example, trim 410 of lighting system 300 includes test button 402. Test button 402 can be connected to an electrical wire (not shown) and electrical signal source and can include any electrical and mechanical components so that, when test button 402 is depressed, an electrical signal is provided on the attached electrical wire and provided to driver 260 and/or emergency ballast 360, and used to test the battery power in emergency ballast 360 as will be described in more detail below.

Figure 4B:
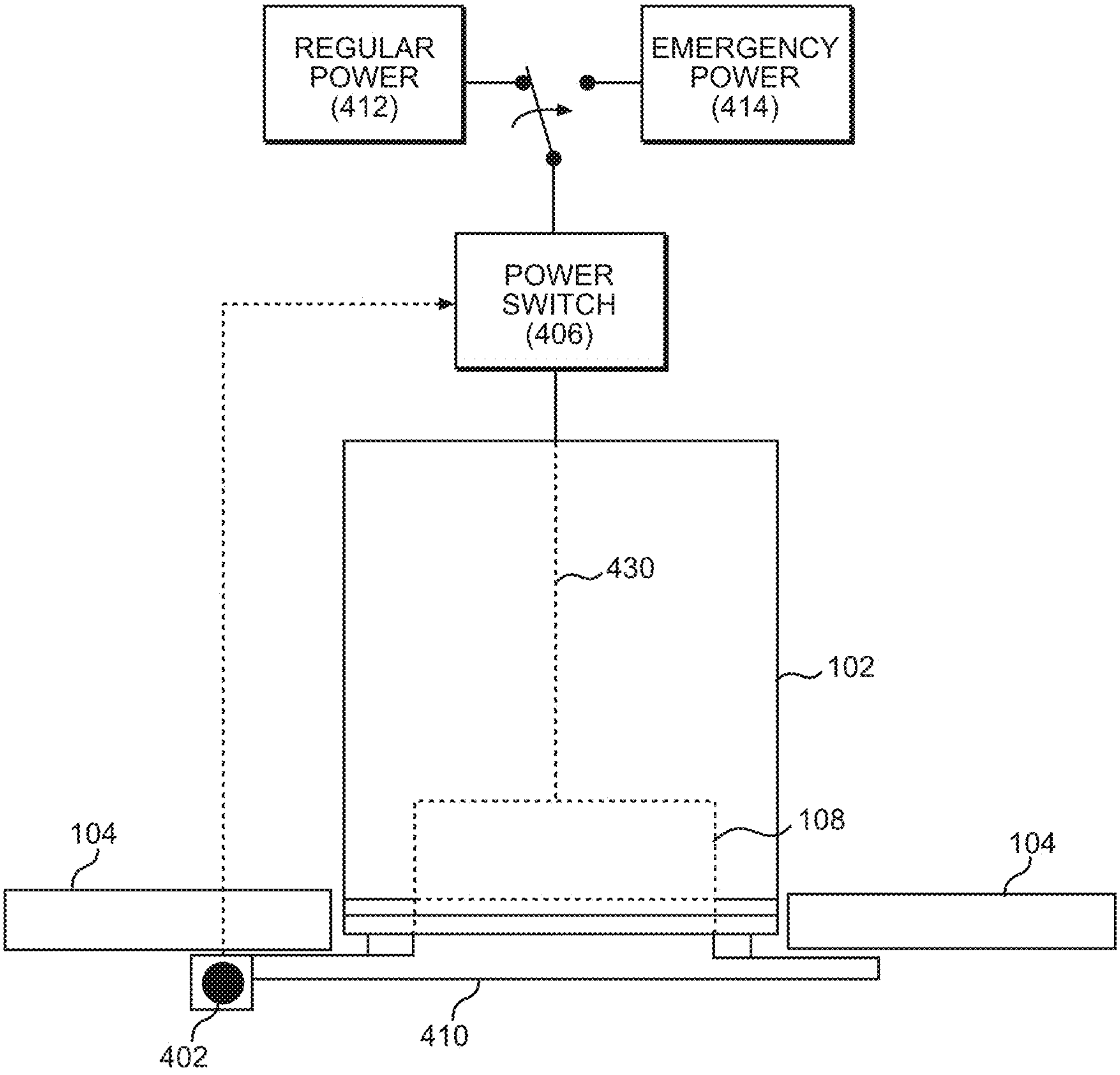

FIG. 4B illustrates example emergency aspects of lighting system 300 having a test button 402. In this example, lighting system 300 is mounted behind a ceiling 104 as described above in connection with FIG. 1C. As such, when lighting system 300 having trim 410 is so installed, button 402, by virtue of being attached to trim 410, is accessible from below ceiling 104. As further illustrated, when button 402 is pressed, an electrical signal is sent to power switch 406 (e.g. in driver 260 or emergency ballast 360), which causes power to the light source assembly 108 (e.g. via wire(s)/connector(s) 430 routed from the test switch 402 to power switch 406) to be switched from regular power source 412 (e.g. a building electrical wiring network) to an emergency power source 414 (e.g. batteries in emergency ballast 360). If the power in the batteries is sufficient, light from light source assembly 108 will be produced, thereby allowing personnel to verify emergency power source 414 without having to remove lighting system 300 from behind the ceiling or otherwise gain direct access to emergency power source 414.

It should be noted that embodiments are not limited to systems 100, 200 and 300 described herein, and that systems 100, 200 and 300 are not necessarily mutually exclusive. For example, according to certain aspects, the same frame 104 installed in a single building location can accommodate certain components at one time (i.e. some combination or all of junction box 102, driver 260 and ballast 360), and other combinations of components at another time. Additionally or alternatively, any or all of such components can be freely serviced and/or replaced with similar components at any given point in time.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

The invention claimed is:

1. A lighting apparatus, comprising:
- a frame in the form of a tray, the frame comprising:
  - a rectangular-shaped bottom portion having a frame opening and a first fastener opening disposed near the frame opening;
  - a plurality of side portions integrally formed with the bottom portion, every edge of the bottom portion having a length and one side portion of the plurality of side portions that spans the length of that edge;
  - a plurality of hanger bar guides, every side portion of the plurality of side portions having at least one hanger bar guide of the plurality of hanger bar guides formed thereon and configured to support a pair of hanger bars;
- a junction box, partially disposed through the frame opening of the frame, defining a cavity and having an opening into the cavity, the cavity being configured to contain a light source inserted through the opening;
- an L-shaped bracket, comprising:
  - a first arm with a second fastener opening that aligns with the first fastener opening; and
  - a second arm directly coupled to the junction box, the second arm being integrally formed with the first arm and oriented at an angle with respect to the first arm;
- a fastener, inserted through the first and second fastener openings, to securely couple the L-shaped bracket to the frame;
- a first pair of hanger bars connected to a first side portion of the plurality of side portions of the frame via at least one hanger bar guide of the plurality of hanger bar guides; and
- a second pair of hanger bars connected to a second side portion of the plurality of side portions of the frame located opposite to the first side portion via at least one hanger bar guide of the plurality of hanger bar guides.

2. The lighting apparatus of claim 1, wherein:
- the L-shaped bracket is a first L-shaped bracket and the fastener is a first fastener;

the bottom portion of the frame further comprises a third fastener opening disposed near the frame opening; and
the lighting apparatus further comprises:
a second L-shaped bracket disposed diametrically opposite to the first L-shaped bracket, the second L-shaped bracket comprising:
a third arm with a fourth fastener opening that aligns with the third fastener opening; and
a fourth arm directly coupled to the junction box, the fourth arm being integrally formed with the third arm and oriented at an angle with respect to the third arm; and
a second fastener inserted through the third and fourth fastener openings, to securely couple the second L-shaped bracket to the frame.

3. The lighting apparatus of claim 1, wherein the junction box has a cylindrical shape.

4. The lighting apparatus of claim 1, wherein the junction box has an end defining the opening, the end including at least one pair of diametrically opposed notches.

5. The lighting apparatus of claim 1, further comprising:
the light source; and
a driver disposed in the cavity of the junction box.

6. The lighting apparatus of claim 5, wherein:
the light source is disposed in a light source housing having one or more fins; and
the lighting apparatus further comprises:
a trim coupled to the light source via a twist-and-lock mechanism and partially disposed within the cavity of the junction box.

7. The lighting apparatus of claim 1, further comprising:
an external housing, coupled to the bottom portion of the frame and disposed adjacent to the junction box, configured to contain at least a portion of a plurality of wires.

8. The lighting apparatus of claim 7, further comprising:
a metal conduit having a first end directly coupled to a top portion of the junction box and a second end directly coupled to the external housing; and
a plurality of wires, at least partially disposed in the metal conduit and the external housing, to supply electrical power from the external housing to the junction box.

9. The lighting apparatus of claim 8, wherein:
the external housing is a first external housing, the metal conduit is a first metal conduit and the plurality of wires is a first plurality of wires; and
the lighting apparatus further comprises:
a ballast support bracket having a base portion directly coupled to the bottom portion of the frame and having a platform in parallel alignment with the bottom portion;
a ballast having a second external housing coupled to the platform of the ballast support bracket, the second external housing containing a plurality of batteries to supply electrical power to the junction box;
a second metal conduit having a first end directly coupled to a top portion of the junction box and a second end directly coupled to the second external housing; and
a second plurality of wires, at least partially disposed in the second metal conduit and the second external housing, to supply electrical power from the second external housing to the junction box.

10. A lighting apparatus, comprising:
a frame in the form of a tray, the frame comprising:
a rectangular-shaped bottom portion having a frame opening;
a plurality of side portions integrally formed with the bottom portion, every edge of the bottom portion having one side portion of the plurality of side portions that extends along a length of that edge;
a plurality of hanger bar guides, every side portion of the plurality of side portions having at least one hanger bar guide of the plurality of hanger bar guides formed thereon and configured to support a pair of hanger bars;
a junction box, partially disposed through the frame opening of the frame, defining a cavity and having an end defining an opening into the cavity, the cavity being configured to contain a light source inserted through the opening, the junction box being cylindrical in shape, the end including at least one pair of diametrically opposed notches;
at least one bracket directly coupled to the junction box and coupled to the frame via a fastener;
a first pair of hanger bars connected to a first side portion of the plurality of side portions of the frame via at least one hanger bar guide of the plurality of hanger bar guides; and
a second pair of hanger bars connected to a second side portion of the plurality of side portions of the frame located opposite to the first side portion via at least one hanger bar guide of the plurality of hanger bar guides.

11. The lighting apparatus of claim 10, further comprising:
the light source; and
a driver disposed in the cavity of the junction box.

12. The lighting apparatus of claim 11, wherein:
the light source is disposed in a light source housing having one or more fins; and
the lighting apparatus further comprises:
a trim coupled to the light source via a twist-and-lock mechanism and partially disposed within the cavity of the junction box.

13. The lighting apparatus of claim 10, further comprising:
an external housing coupled to the bottom portion of the frame and disposed adjacent to the junction box;
a metal conduit having a first end directly coupled to a top portion of the junction box and a second end directly coupled to the external housing; and
a plurality of wires, at least partially disposed in the metal conduit and the external housing, to supply electrical power from the external housing to the junction box.

14. The lighting apparatus of claim 13, wherein:
the external housing is a first external housing, the metal conduit is a first metal conduit and the plurality of wires is a first plurality of wires; and
the lighting apparatus further comprises:
a ballast support bracket having a base portion directly coupled to the bottom portion of the frame and having a platform in parallel alignment with the bottom portion;
a ballast having a second external housing coupled to the platform of the ballast support bracket, the second external housing containing a plurality of batteries to supply electrical power to the junction box;
a second metal conduit having a first end directly coupled to a top portion of the junction box and a second end directly coupled to the second external housing; and
a second plurality of wires, at least partially disposed in the second metal conduit and the second external housing, to supply electrical power from the second external housing to the junction box.

15. A lighting apparatus, comprising:

a frame in the form of a tray, the frame comprising:

a bottom portion having a frame opening having a first fastener opening disposed near the frame opening;

a first side portion integrally formed with the bottom portion;

a second side portion integrally formed with the bottom portion and disposed opposite to the first side portion;

a first hanger bar guide formed on the first side portion and configured to support a pair of hanger bars;

a second hanger bar guide formed on the second side portion and configured to support a pair of hanger bars;

a junction box, partially disposed through the frame opening of the frame, defining a cavity and having an opening into the cavity, the cavity being configured to contain a light source inserted through the opening, the junction box being cylindrical in shape;

an L-shaped bracket, comprising:

a first arm with a second fastener opening that aligns with the first fastener opening; and a second arm directly coupled to the junction box, the second arm being integrally formed with the first arm and oriented at an angle with respect to the first arm;

a fastener, inserted through the first and second fastener openings, to securely couple the L-shaped bracket to the frame;

a first pair of hanger bars connected to the first side portion via the first hanger bar guide; and a second pair of hanger bars connected to the second side portion via the second hanger bar guide.

16. The lighting apparatus of claim 15, wherein:

the L-shaped bracket is a first L-shaped bracket and the fastener is a first fastener;

the bottom portion of the frame further comprises a third fastener opening disposed near the frame opening; and the lighting apparatus further comprises:

a second L-shaped bracket disposed diametrically opposite to the first L-shaped bracket, the second L-shaped bracket comprising:

a third arm with a fourth fastener opening that aligns with the third fastener opening; and a fourth arm directly coupled to the junction box, the fourth arm being integrally formed with the third arm and oriented at an angle with respect to the third arm; and a second fastener inserted through the third and fourth fastener openings, to securely couple the second L-shaped bracket to the frame.

17. The lighting apparatus of claim 15, further comprising:

the light source; and a driver disposed in the cavity of the junction box.

18. The lighting apparatus of claim 17, wherein:

the light source is disposed in a light source housing having one or more fins; and the lighting apparatus further comprises:

a trim coupled to the light source via a twist-and-lock mechanism and partially disposed within the cavity of the junction box.

19. The lighting apparatus of claim 15, further comprising:

an external housing coupled to the bottom portion of the frame and disposed adjacent to the junction box;

a metal conduit having a first end directly coupled to a top portion of the junction box and a second end directly coupled to the external housing; and a plurality of wires, at least partially disposed in the metal conduit and the external housing, to supply electrical power from the external housing to the junction box.

20. The lighting apparatus of claim 19, wherein:

the external housing is a first external housing, the metal conduit is a first metal conduit and the plurality of wires is a first plurality of wires; and the lighting apparatus further comprises:

a ballast support bracket having a base portion directly coupled to the bottom portion of the frame and having a platform in parallel alignment with the bottom portion;

a ballast having a second external housing coupled to the platform of the ballast support bracket, the second external housing containing a plurality of batteries to supply electrical power to the junction box;

a second metal conduit having a first end directly coupled to a top portion of the junction box and a second end directly coupled to the second external housing; and a second plurality of wires, at least partially disposed in the second metal conduit and the second external housing, to supply electrical power from the second external housing to the junction box.

* * * * *